Feb. 25, 1947.  H. T. AVERY  2,416,369
ACTUATING MECHANISM FOR REGISTERS
Original Filed Aug. 2, 1940   13 Sheets-Sheet 1

INVENTOR.
Harold T. Avery.
BY Naylor and Lassagne
ATTORNEYS.

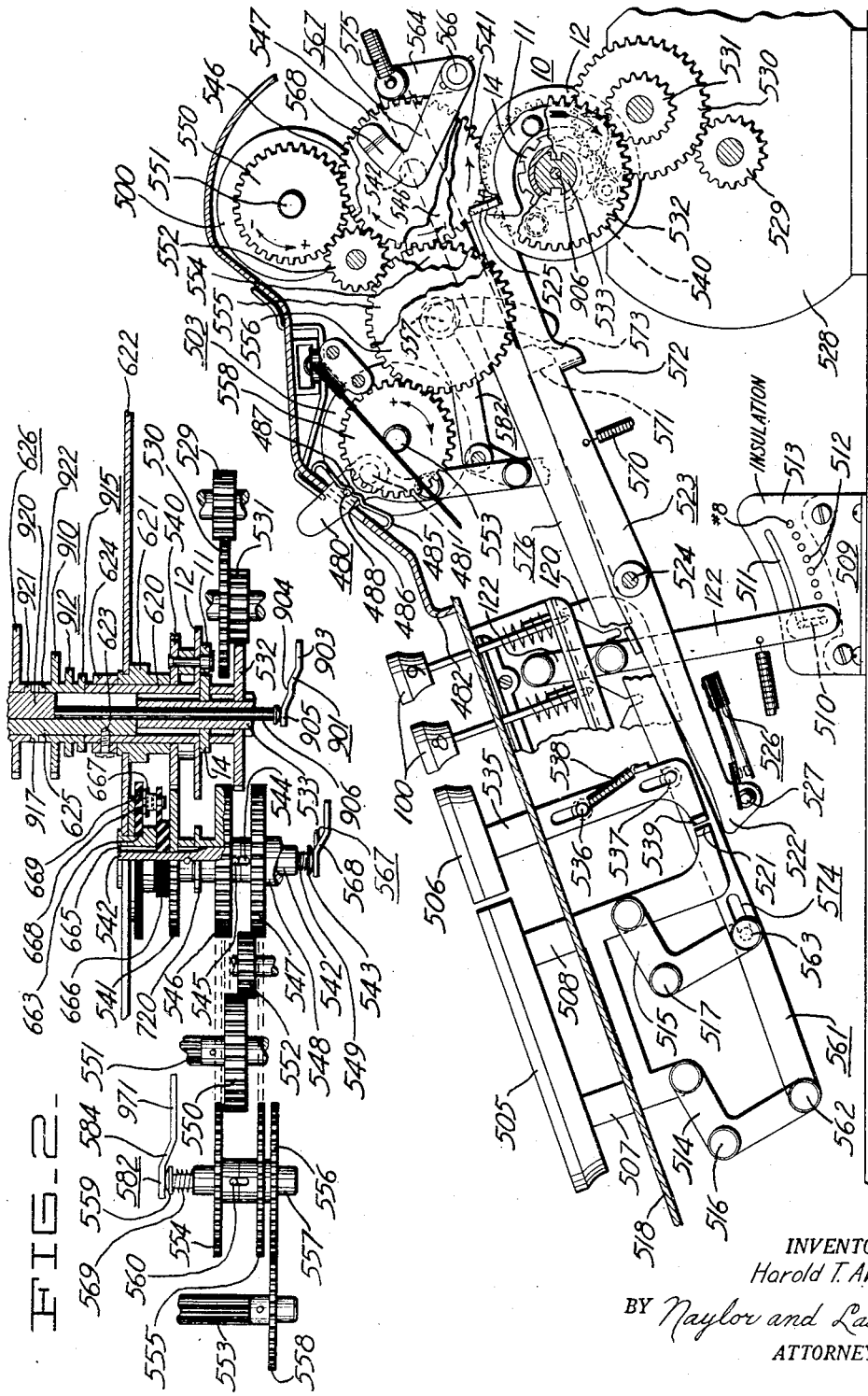

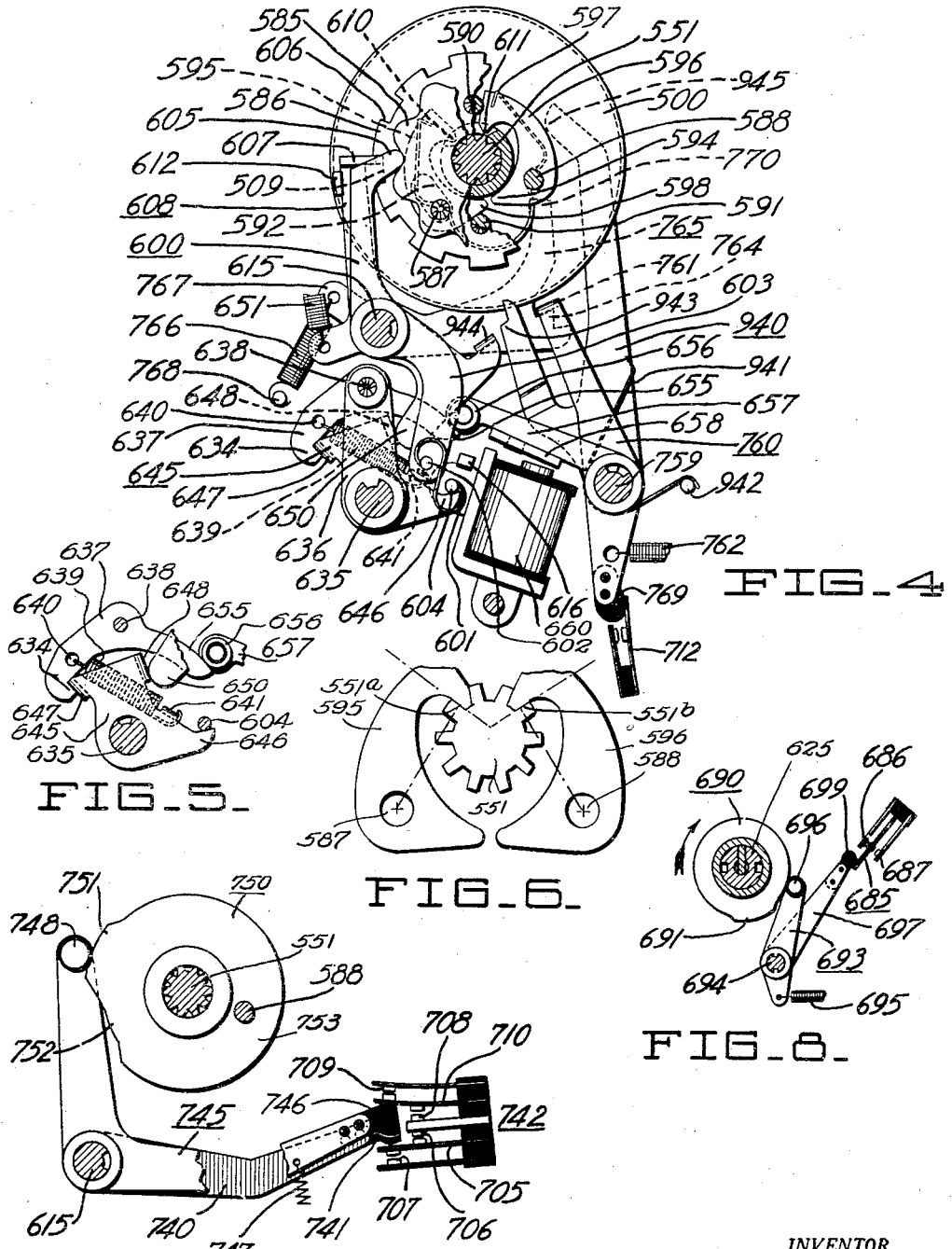

Feb. 25, 1947.   H. T. AVERY   2,416,369
ACTUATING MECHANISM FOR REGISTERS
Original Filed Aug. 2, 1940   13 Sheets—Sheet 4

INVENTOR.
Harold T. Avery.
BY Naylor and Lassagne
ATTORNEYS.

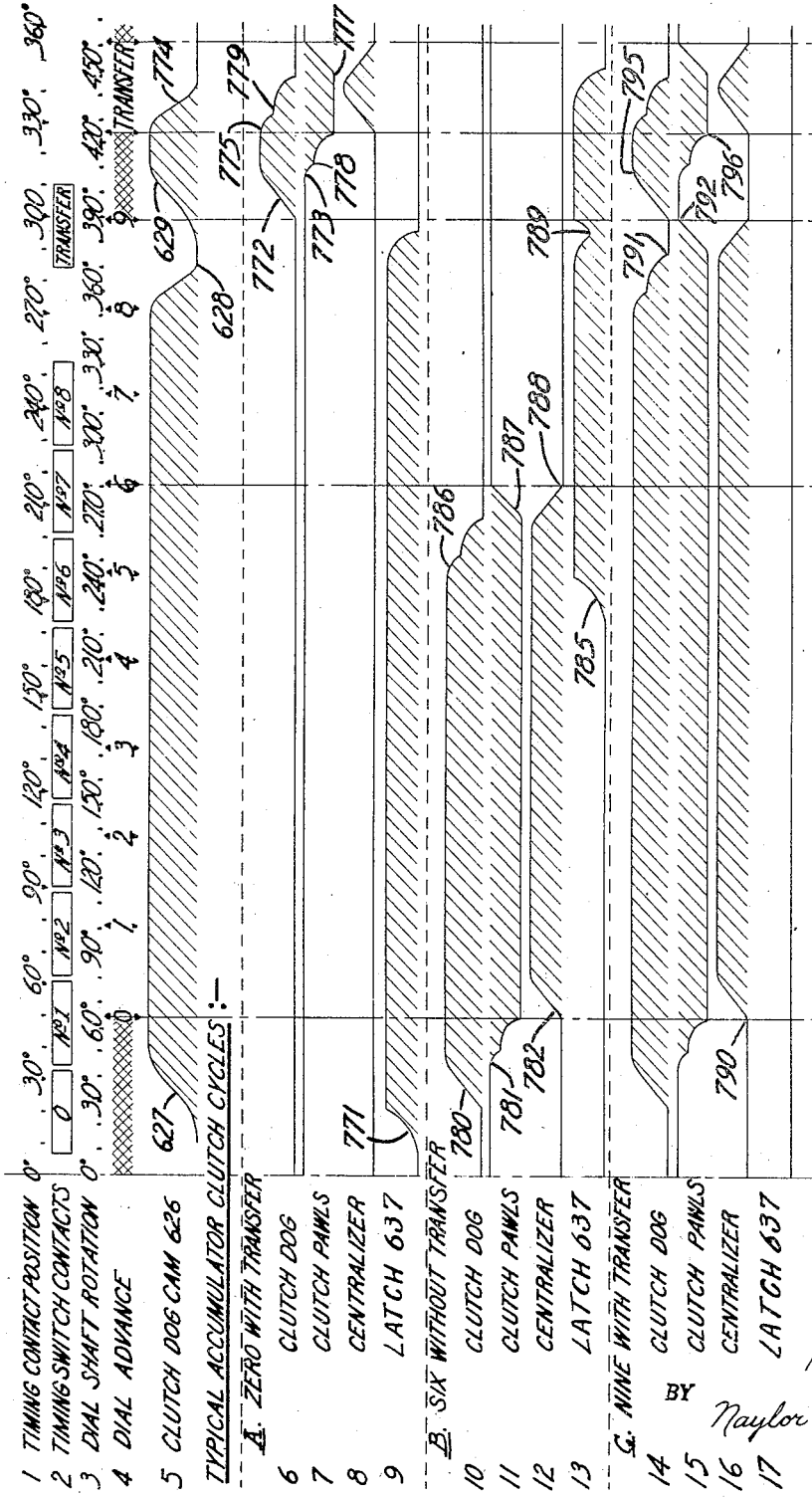

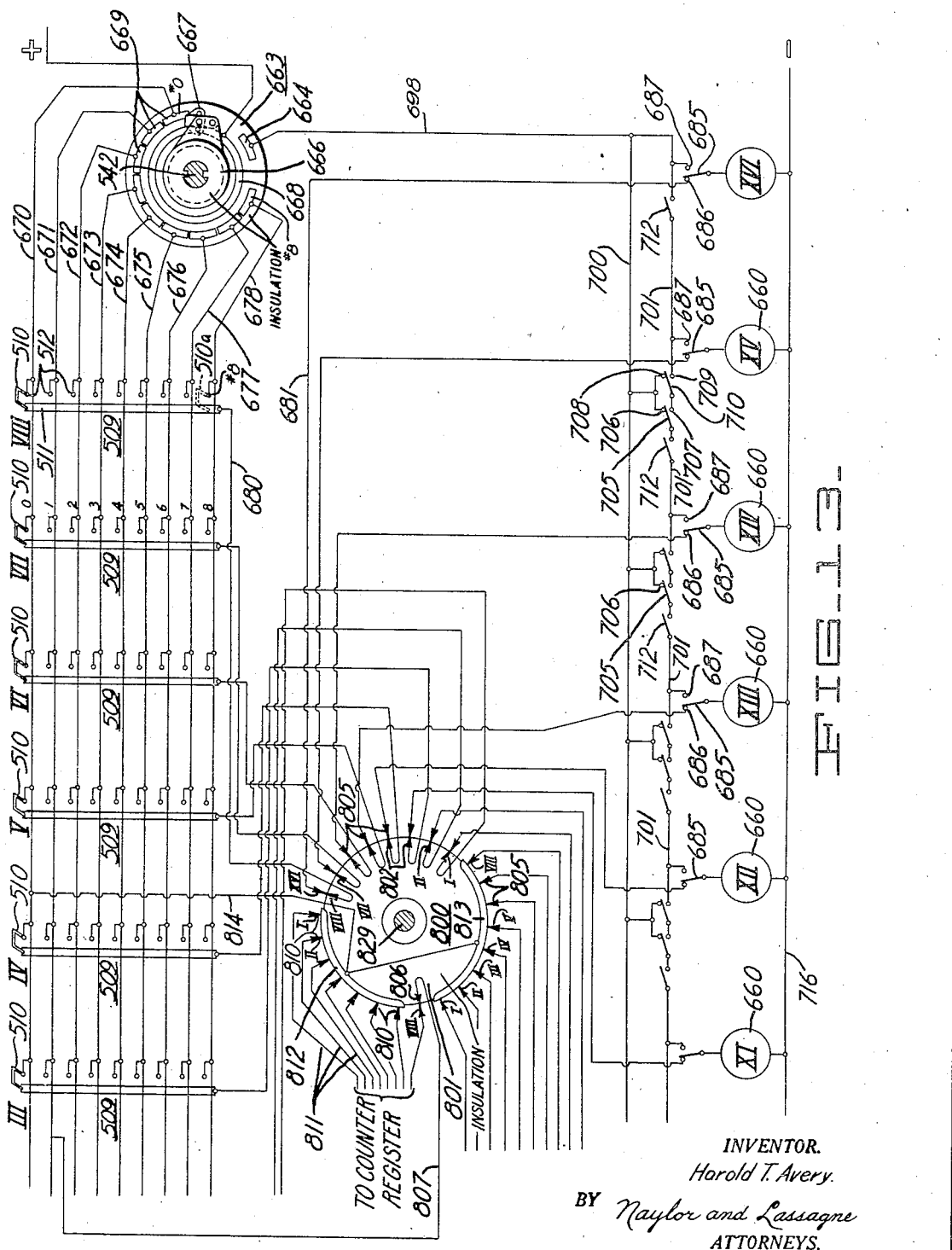

Feb. 25, 1947.   H. T. AVERY   2,416,369
ACTUATING MECHANISM FOR REGISTERS
Original Filed Aug. 2, 1940   13 Sheets-Sheet 7
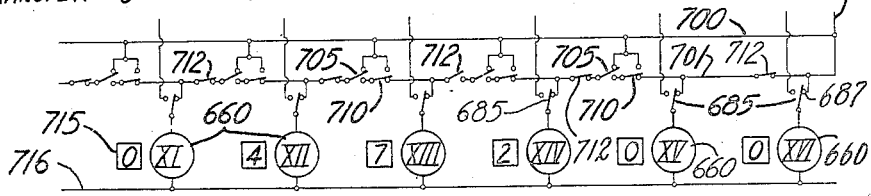
FIG_14_
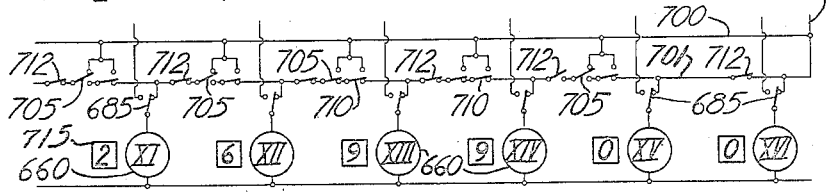
FIG_15_
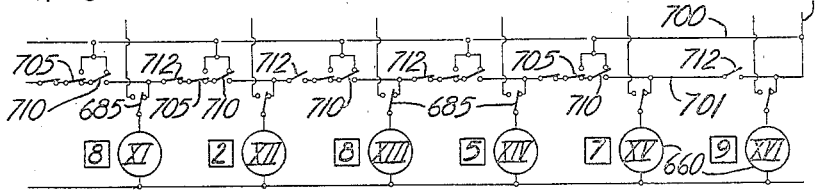
FIG_16_
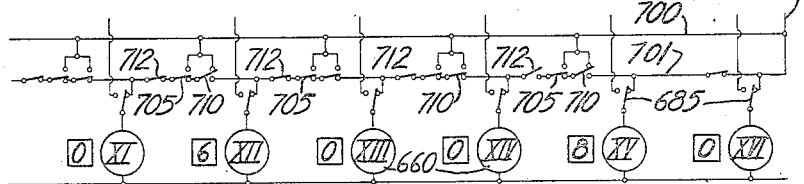
FIG_17_
INVENTOR.
Harold T. Avery.
BY Naylor and Lassagne
ATTORNEYS.

Feb. 25, 1947.   H. T. AVERY   2,416,369
ACTUATING MECHANISM FOR REGISTERS
Original Filed Aug. 2, 1940   13 Sheets-Sheet 8

INVENTOR.
Harold T. Avery.
BY Naylor and Lassagne
ATTORNEYS.

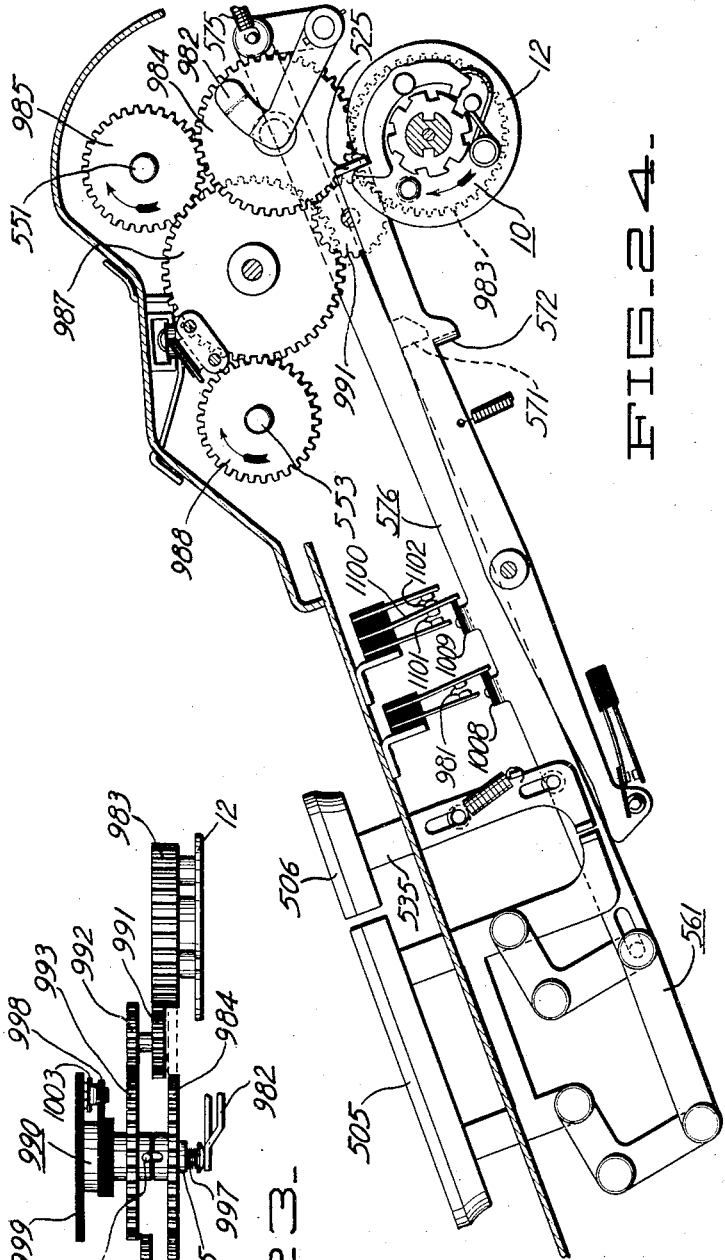

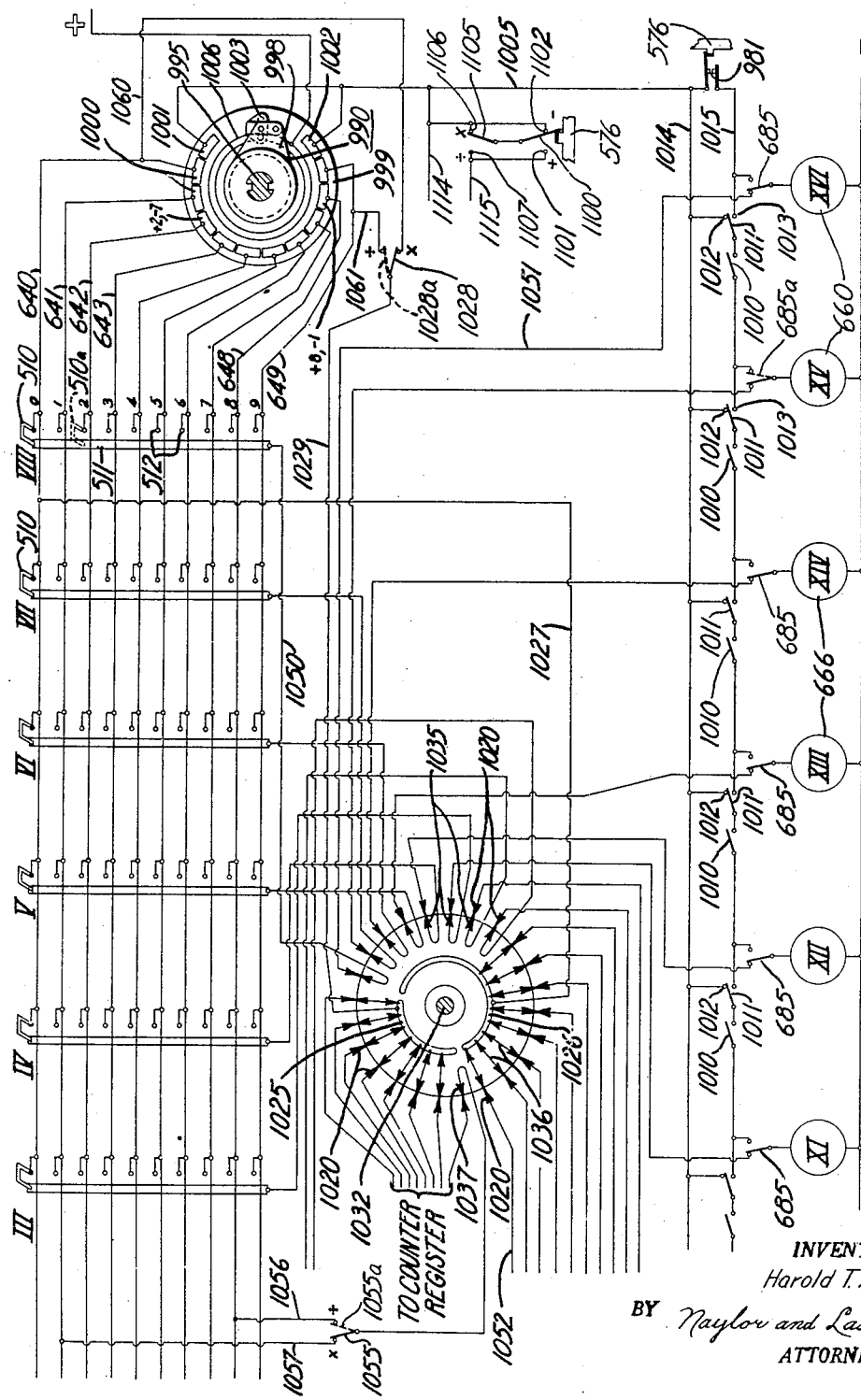

Feb. 25, 1947. H. T. AVERY 2,416,369
ACTUATING MECHANISM FOR REGISTERS
Original Filed Aug. 2, 1940 13 Sheets-Sheet 11
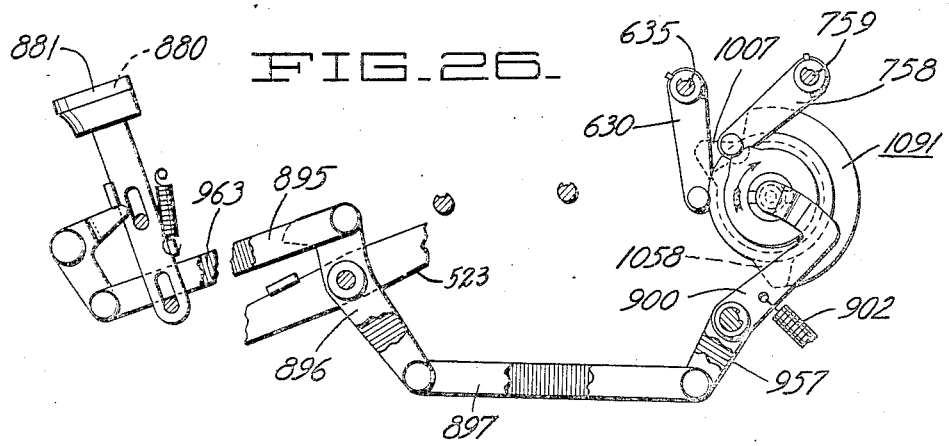
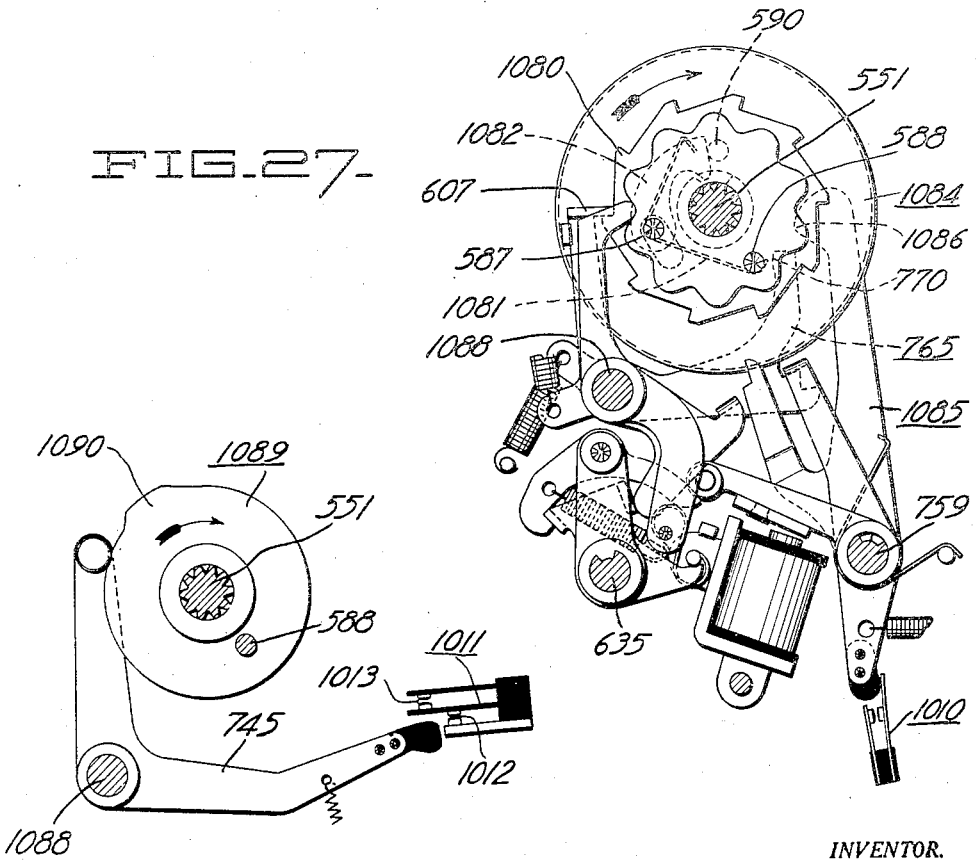
INVENTOR.
Harold T. Avery.
BY Naylor and Lassagne
ATTORNEYS.

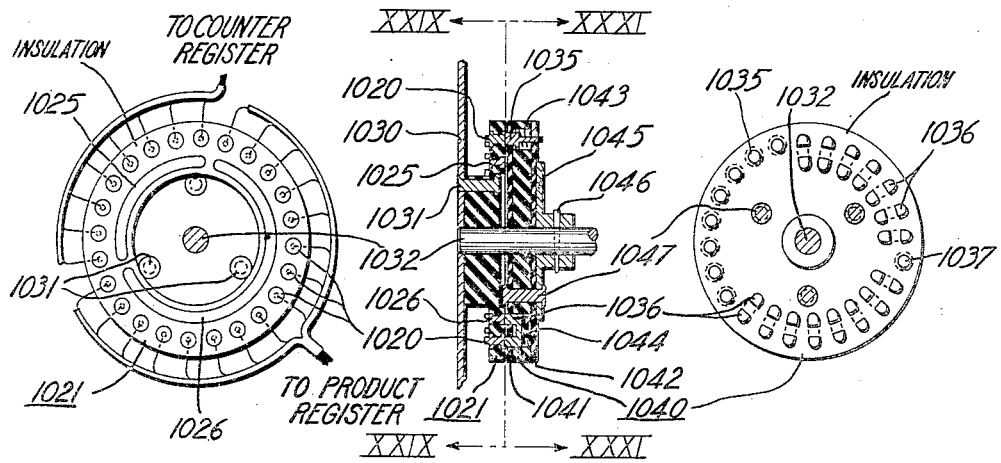
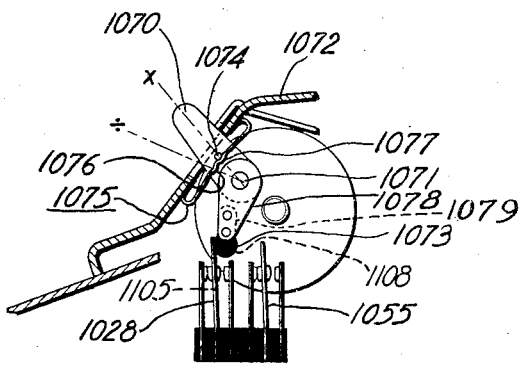

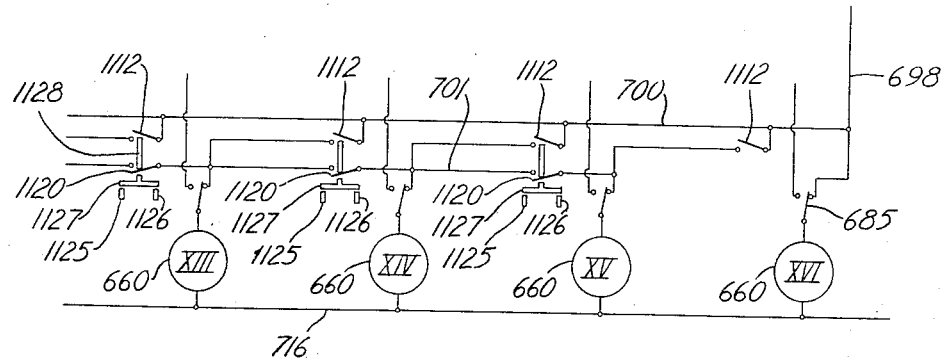
FIG.33.
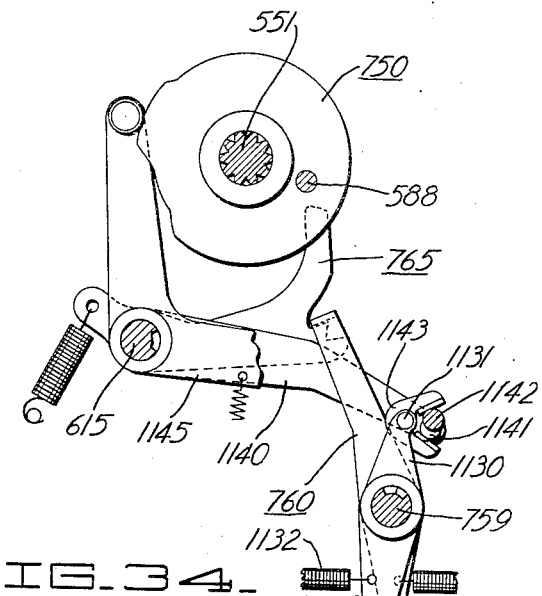
FIG.34.
INVENTOR.
Harold T. Avery
BY
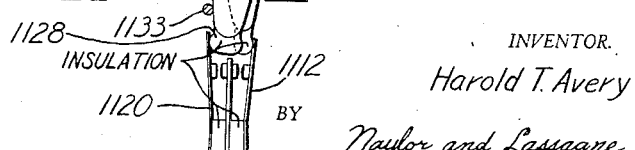
ATTORNEYS.

Patented Feb. 25, 1947

2,416,369

UNITED STATES PATENT OFFICE 2,416,369

ACTUATING MECHANISM FOR REGISTERS

Harold T. Avery, Oakland, Calif., assignor to Marchant Calculating Machine Company, a corporation of California Original application August 2, 1940, Serial No. 349,940. Divided and this application May 1, 1945, Serial No. 591,250

26 Claims. (Cl. 235—79)

The present invention relates to motor driven calculating machines and, more particularly, to registering devices of the type in which each registering dial or numeral wheel is driven a selected amount by an individual clutch.

Most present day calculating machines employ a shiftable accumulator register containing indicating dials and a separate, stationary actuator of considerable size, weight, and cost. In machines of this type there is necessarily provided in connection with each dial of the accumulator register, transmission mechanisms to transmit movement from the actuator to the dial, and pawling devices for preventing displacement of the dial when it is disconnected from the actuator.

Although the machine of the present invention contemplates providing an independent actuating unit in the form of a clutching mechanism for each accumulator dial, and the total number of actuating units is thereby increased, the total cost of the combined actuating devices is substantially reduced, since it is possible to eliminate the transmission mechanism required in connection with the prior art actuator units.

The present construction of dial clutching devices is particularly advantageous in that it eliminates the necessity of mechanically shifting the accumulator, by making practicable an electrical shifting mechanism involving merely the movement of a relatively simple and light switching device. This further reduces the total cost of the machine, and makes it possible to enclose the compact mechanism in a well rounded and smooth casing, thereby improving the exterior appearance of the machine to a degree not heretofore possible with an externally shiftable carriage.

An object of the invention is to provide an accumulator register for a motor driven calculating machine in which each dial has a clutch unit directly and permanently associated therewith for selectively coupling that dial to the motor for a selected interval of time, to enter a desired value into that dial.

Another object of the invention is to provide a reversible dial clutch construction and electrical controlling devices for selectively stopping the dial irrespective of the direction of rotation thereof.

Still another object of the present invention is to provide improved electrical switching means for effecting tens transfer from one dial to another in a machine of the type referred to.

It is an additional object of the present invention to provide electrical switching means for conditioning an accumulator mechanism for chain transfer of tens.

Another object is to reduce the current drain of an electrically actuated machine, and particularly the peak current that may be drawn at any instant.

An important feature of the invention is a calculating machine in which the cooperative relation between the elements is such as to greatly simplify and reduce the size of the parts of the registering, actuating, and tens transfer mechanism which constitute the essential elements of any commercial calculating machine. Briefly, by employing power to engage a dial clutch at a fixed time and then selectively disengaging the clutch to determine the extent of rotation of the dial, it is possible to: (1) develop an extremely compact clutch mechanism adapted for high speed operation and relatively inexpensive to manufacture; (2) develop a sensitive, reliable, and practicable control mechanism for selectively disabling the clutch to control the extent of movement of the dial both for digitation and tens transfer.

Another feature of the invention resides in the use of control devices in which operation is selectively determined by momentary energization of an electromagnet, the fact that only momentary energization of the magnet is necessary making it possible to employ much smaller electromagnets than would otherwise be possible without objectionable heating effect.

Only objects and features of the invention will become apparent from the detailed description to follow of two different embodiments of the invention that are illustrated in the drawings in which:

Figures 1 to 21, inclusive, relate to the first embodiment; and

Figures 22 to 32, inclusive, relate to the second embodiment.

Figures 33 and 34 relate to an alternative tens transfer switching arrangement for the first embodiment.

This is a division of my co-pending patent application Serial Number 349,940, filed on August 2, 1940.

FIRST EMBODIMENT

Figure 2 is a top view of the driving mechanism of the machine, shown partly schematically and partly in section;

Figure 3 is a right side view showing the general arrangement of the setting mechanism and the relation of the control keys to the driving mechanism;

Figure 4 is an enlarged right side detail view of the accumulator clutch and the controls therefor;

Figure 5 is a fragmentary right side view of certain of the elements partially shown in Figure 4;

Figure 6 is a schematic view showing the relation between the toothed drive shaft and the clutch pawl;

Figure 7 is an enlarged right side view of a plurality of cam set electrical switches, for determining a tens transfer operation;

Figure 8 is a detail right side view of a cam set switch for shifting the accumulator clutch controlling circuit from digitation to tens-transfer positions;

Figure 12 is a timing chart showing the timed relation between the electrical and mechanical controlling devices of the machine;

Figure 13 is a schematic circuit diagram showing the shift switch and the relation of the actuator timing switch and selection mechanism to the electrical accumulator clutch controls;

Figure 18:
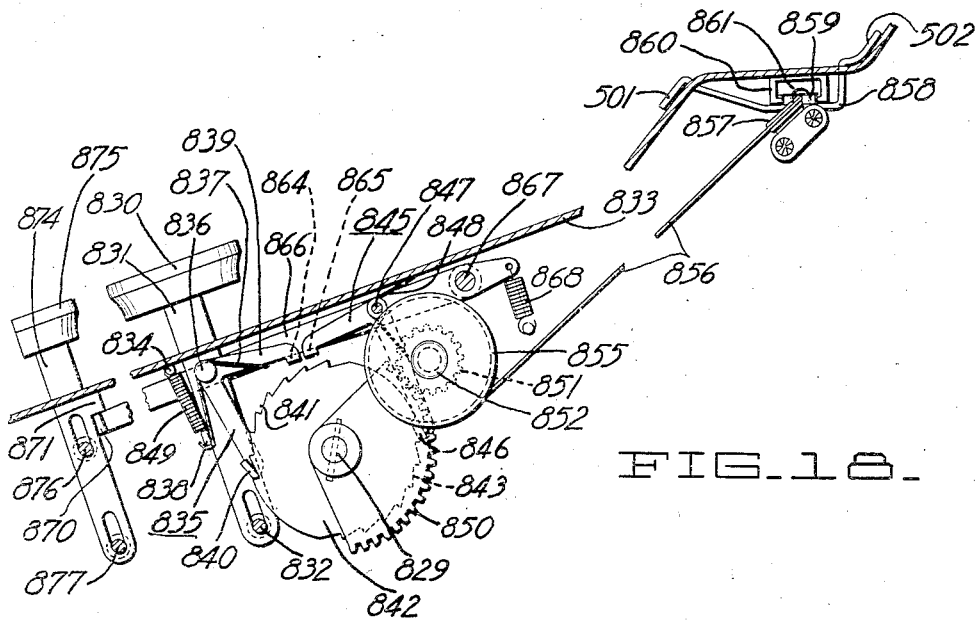
Figures 19, 20, 21:
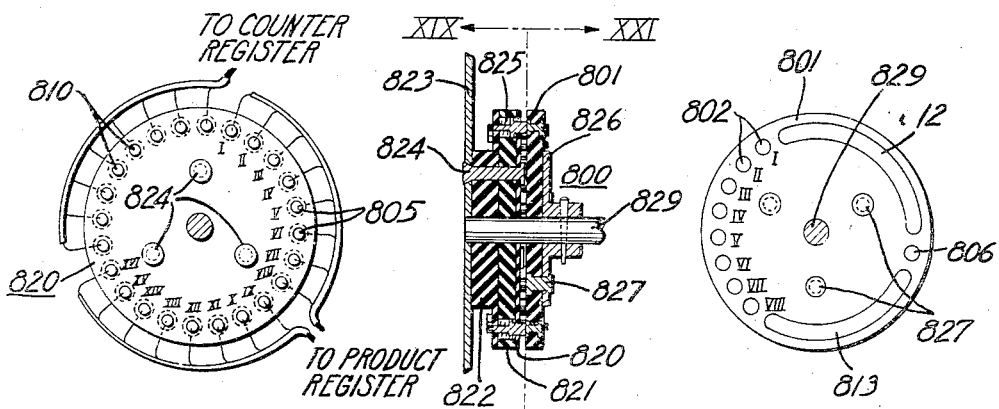

Figures 14 to 17, inclusive, are tens transfer circuit diagrams showing the varying positions of the electrical switches according to different specific examples;

Figure 18 is a right side view of the shift key and clear keys and the means for respectively actuating and resetting the shift switch and decimal indicator;

Figure 19 is a sectional view of the shift switch looking from the right, the view being taken in the plane XIX—XIX of Figure 20;

Figure 20 is a vertical sectional view through the shift switch, the view being taken looking from the front of the machine;

Figure 21 is a sectional view, taken substantially in the plane XXI—XXI of Figure 20.

SECOND EMBODIMENT

Figure 22 is a timing chart showing how the timing of the second embodiment differs from that of the first embodiment;

Figure 23 is a schematic view of the unidirectional drive to the accumulator shafts and the reversible drive to the actuator timing switch;

Figure 24 is a right side view showing the general arrangement of the machine and the relation of the control keys to the driving mechanism;

Figure 25 is a schematic circuit diagram for the machine;

Figure 26 is a right side view of the accumulator control cams and the linkage from the clearance keys which selectively connect different groups of the cams to the driving mechanism;

Figure 27 is an enlarged right side view of a unidirectional accumulator clutch and controls therefor;

Figure 28 is an enlarged right side view of a cam and mechanism actuated thereby which controls the transfer switches according to the position of the dials;

Figure 29 is a sectional view through the shift switch, taken substantially in the plane XXIX—XXIX of Figure 30;

Figure 30 is a sectional view of the shift switch taken through the axis thereof;

Figure 31 is a sectional view of the shift switch taken in the plane XXXI—XXXI of Figure 30;

Figure 32 is a right side view of the lever which conditions the machine for division or multiplication;

*Alternative switching arrangement for the first embodiment*

Figure 33 is a schematic diagram illustrating a modification of the circuit shown in Figure 13; and Figure 34 is an enlarged right side view of cam-set electrical switches alternative to those disclosed in Figure 7.

FIRST EMBODIMENT

Figure 1:
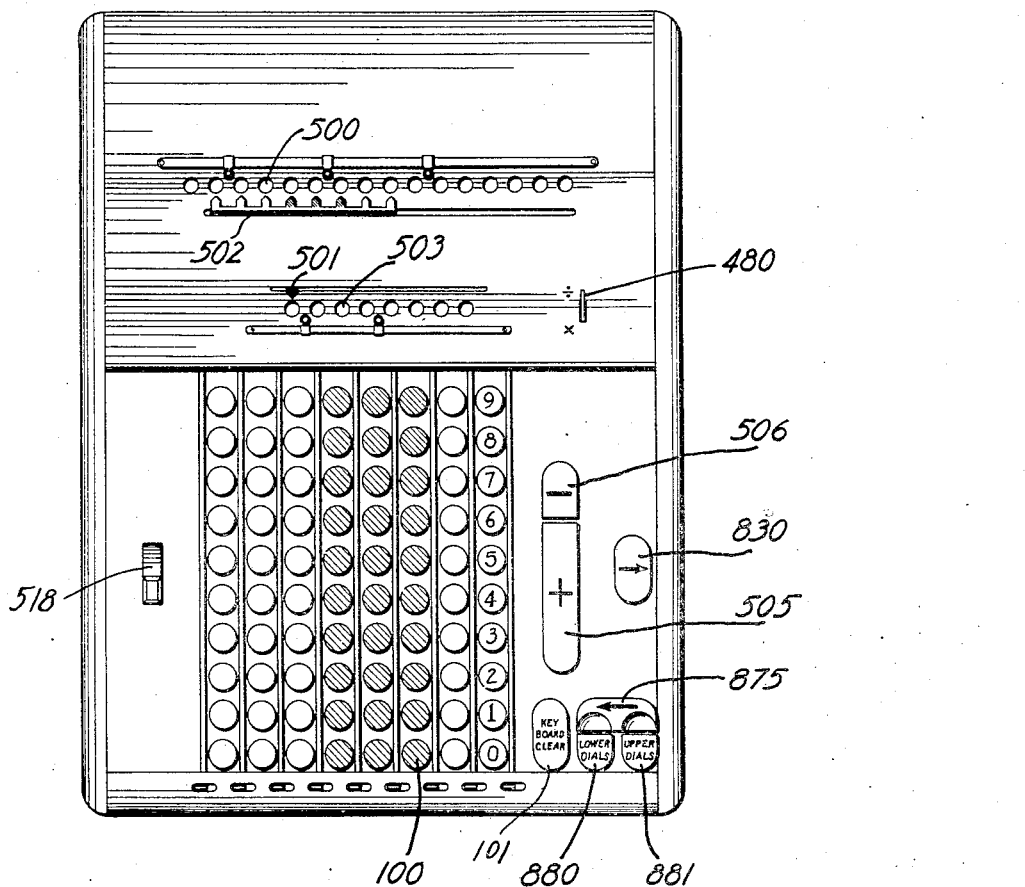
Figure 1 is a top exterior view of the first embodiment of the invention, showing the general arrangement of the control keys and accumulator registers.

Referring to the general view of Figure 1, the machine is provided with a flexible type keyboard comprising factor keys 100, a plus key 505, a minus key 506, shift keys 830 and 875, an accumulator register 500, a counter register 503, a counter dial reverse lever 480, and ordinal indicators 501 and 502.

The accumulator dials are rotated under the control of the keyboard, which may be selectively electrically associated with the different groups of dials in different orders of the accumulator register. This selective association of the keyboard with different orders of the accumulator is controlled by the shift keys 830 and 875, and is indicated by the ordinal indicators 501 and 502 which move together. The indicator 501 indicates the counter dial that is operative, and the indicator 502 indicates which eight orders of the accumulator are electrically connected to the eight keyboard orders. In order to facilitate the entry of factors set in the keyboard into the accumulator register 500 in correct decimal relation, the eight tips of the indicator 502 are preferably selectively colored to correspond to the colors of the eight rows of keys 100, whereby the operator can tell at a glance the decimal relation between the keyboard and the accumulator register. Each depression of the shift key 830 shifts the indicators 501 and 502 one step toward the right, and electrically associates the keyboard with the new orders indicated. A single depression of the key 875 effects a complete shift in the opposite direction, and returns the indicators from any rightward position they may be in, to the initial leftmost position shown in Figure 1.

The accumulator register 500 and the counter register 503 each comprises a plurality of ordinal accumulator units, each of which units is independently clutched to and declutched from a common shaft on which all are mounted. The clutches employed are of the ratchet type and are engaged at a fixed time and disengaged at selected times, and are constructed so as to effect operation in either direction of rotation.

A main switch 518 is provided to control the power supply to the electrical equipment in the machine.

DIAL SHAFT DRIVING MECHANISM

Following the depression of the proper keys 100 to introduce a desired factor into the selection mechanism in a manner to be described later, operation is initiated by depressing either the plus key 505 or the minus key 506. This starts the motor, engages the main clutch to drive the dial shafts from the motor, and also conditions the driving mechanism between the motor and the dial shafts to determine their direction of rotation.

Both the counter dials and the accumulator dials may be driven in either direction or in opposite directions simultaneously. During addition and multiplication, the accumulator dials and the counter dials are rotated in plus (counter-clockwise) direction.

During subtraction and division, the accumulator dials are driven in minus (clockwise) direction, and the counter dials are driven in plus direction.

In complementary multiplication, the accumulator dials are driven in plus direction and the counter dials are driven in minus direction; and in negative multiplication, the accumulator dials are driven in minus direction and the counter dials are driven in plus direction.

In complementary division, both the accumulator dials and the counter dials are driven in minus direction.

The mechanism for driving the accumulator shaft 551 (Fig. 3) and counter register shaft 553 from the motor 528 includes a main clutch 19 which has a driving member driven clockwise by a motor 528 through gears 529, 530, 531, 532, a shaft 533 and a ratchet wheel 14 keyed on shaft 533. The main clutch 19 also includes a driven member selectively connectible with the driving member in a manner to be described later, said driven member having a gear 540 meshing with a gear 541 fixed to a shaft 542. This shaft 542 has rotatably mounted thereon (Fig. 2) a pair of gears 546 and 547 adapted to be selectively coupled one at a time to the shaft 542. Thus the lower end (with reference to Fig. 2) of shaft 542 is hollow and contains an axially movable pin 543, which pin has secured thereto a lateral pin 545 extending through a longitudinal slot 544 in the shaft 542. The outer end of pin 545 engages a notch in a hub on either gear 546 or gear 547, depending upon the axial position of pin 543. As shown in Fig. 2, pin 545 is in engagement with the gear 546 and the latter is being driven by the shaft 542. Obviously, if the pin 543 is shifted outwardly (downwardly in Fig. 2) then the pin 545 will be disengaged from gear 546 and engaged with gear 547, causing the latter to be driven with shaft 542.

Gear 546 meshes directly with a gear 550 (Fig. 3) on the accumulator shaft 551, and since the gear 546, when engaged by pin 545, rotates counterclockwise, it rotates the accumulator shaft 551 clockwise, which is the minus direction.

The accumulator drive gear 550 is driven directly by the gear 546. The accumulator drive gear 550 also meshes with and drives an idler gear 552 meshing with the gear 547 (Fig. 2) which, under the conditions prevailing, is freely rotatable on shaft 542. Gear 546 also permanently meshes with a gear 554 mounted on a shaft 557. Gear 554 may be locked to the latter shaft by a transverse pin 560 on an axial pin 559 corresponding to the transverse pin 545 and the axial pin 543 associated with shaft 542. A gear 556, fixed to shaft 557, meshes with a gear 558 on the counter register shaft 553.

Summarizing, gear 546, rotating counter-clockwise, drives accumulator gear 550 clockwise (which is its minus direction); gear 546 also drives gear 554 clockwise; gear 554 drives gear 556 in the same direction (clockwise), and gear 556 drives the counter register gear 558 counter-clockwise, which is its plus direction.

Therefore, with the apparatus in the condition shown in Figs. 2 and 3, the accumulator shaft 551 is driven clockwise or minus and the counter register shaft 553 is driven counter-clockwise, which is its plus direction.

To change the directions of rotation of the accumulator and counter register shafts, the lever 567 or the lever 582 (or both) are rocked. The lever 582 is controlled by the counter dial reverse lever 480 in a manner to be described later, and the lever 567 is controlled by the plus key 505 in a manner to be described later.

If the lever 567 is rocked counter-clockwise (Fig. 3), the pin 543 (Fig. 2) is moved outwardly by its spring 549, to engage the lateral pin 545 with the notch in the hub of the gear 547 so that the latter gear (instead of the gear 546) is directly driven by the shaft 542 in counter-clockwise direction. Gear 547 therefore drives idler gear 552 clockwise, which in turn drives the accumulator gear 550 in counter-clockwise (plus) direction. Gear 546 rotating clockwise, drives gear 554 counter-clockwise, which in turn drives the counter register gear 558 in clockwise (minus) direction.

It will be observed, therefore, that if the lever 567 is shifted, but the lever 582 is not shifted, the directions of rotation of both the accumulator shaft 551 and counter register shaft 553 are reversed, and both shafts still rotate in opposite directions.

If lever 582 is shifted counter-clockwise (with reference to Fig. 3), the pin 559 (Fig. 2) is moved downwardly to engage the lateral pin 560 with the hub of gear 555. This causes the shaft 557 and the gear 556 to be driven from gear 547 instead of gear 546, and since gears 546 and 547 always rotate in opposite direction, the counter register shaft 553 will then be driven in the same direction as the accumulator shaft 551.

The following table is provided for convenient reference in determining the direction of rotation of the accumulator shaft 551 and the counter register shaft 553:

| Position of lever 567 | Position of lever 582 | Direction of rotation of accumulator shaft 551 | Direction of rotation of counter register shaft 553 | Type of calculation |
|---|---|---|---|---|
| Clockwise | Clockwise | Minus | Plus | Subtraction and division. |
| Counter-clockwise | do | Plus | Minus | Complementary multiplication. |
| Clockwise | do | Minus | Plus | Negative multiplication. |
| Counter-clockwise | Counter-clockwise | Plus | do | Addition and multiplication. |
| Clockwise | do | Minus | Minus | Complementary division. |

*Control of counter register reverse unit*

Figure 9:
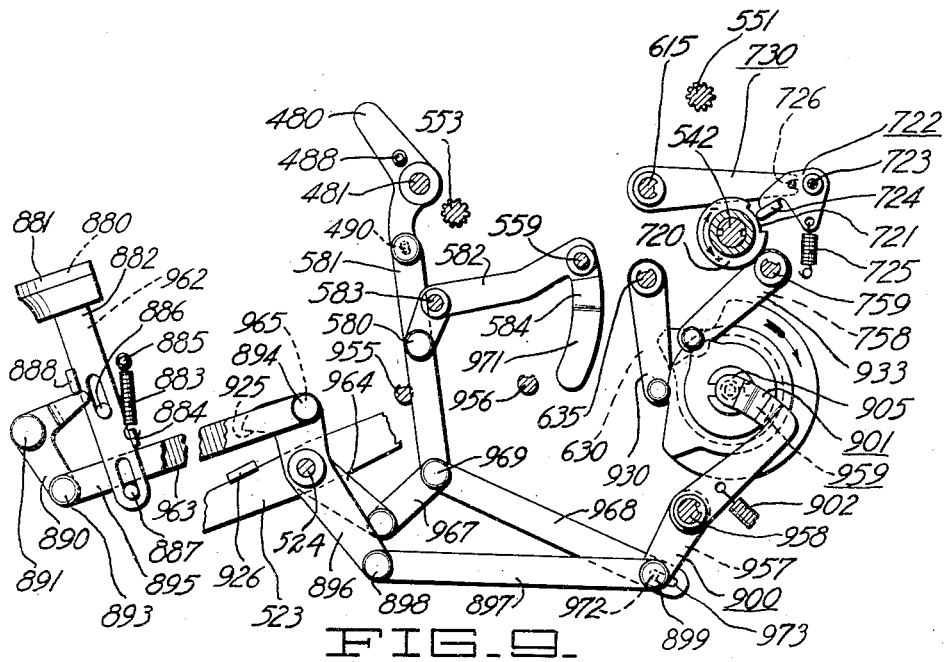
Figure 9 is a right side view of the clearance keys and the control exerted thereby over the driving mechanism and reverse unit.

As previously stated, the lever 582 is controlled by the counter dial reverse lever 480. Thus the counter dial reverse lever 480 is pivotally mounted on a stud 481 (Fig. 3) and is pivotally connected by a second stud 490 (Fig. 9) to the upper end of a lever 581 adapted to rock about an axis 969, which is normally fixed. The lever 581 is pivotally connected, intermediate its ends (by a stud 580), to the left end of lever 582, which is pivoted on a stationary stud 583.

When the lever 480 is in upper position (Fig. 1), opposite the division symbol, the lever 582 (Figs. 9 and 3) is in clockwise position, in which the counter register shaft 553 is rotated in the opposite direction to the accumulator shaft 551.

When the lever 480 is moved downwardly (Fig. 1) opposite the multiplication symbol, the upper end of lever 581 (Fig. 9) is rocked toward the right, thereby rocking the lever 582 counter-clockwise or toward the left with reference to Fig. 2. This causes downward movement of the pin 559 and reversal of the direction of rotation of the counter register shaft 553, as previously described.

The lever 480 is yieldably retained in either extreme position by engagement of a stud 488 thereon (Fig. 3) with one or the other of two recesses 486 and 487 in a leaf spring 485 secured to the top cover of the machine.

OPERATION INITIATING MECHANISM

After a factor has been set up on the keys 100, positive or negative operation of the machine is initiated by pressing either the plus key 505 or the minus key 506.

Depression of either the minus key 506 or the plus key 505 results in the starting of the motor 528 and the engagement of the main clutch 10. Thus the key 506 is mounted on a key stem 535 for vertical movement on studs 536 and 537 and is normally maintained in raised position by a spring 538 tensioned between the stud 536 and an ear on the key stem. An ear 539 is formed on the lower end of the key stem in position overlying the left end 522 of a clutch actuating lever 523 which is pivoted on a stationary stud 524 so that when the key 506 is depressed it rocks the lever 523 counter-clockwise against the tension of a spring 570. Depression of the left end 522 of lever 523 shifts a stud 527 thereon to permit closure of a switch 526 in the motor circuit, thereby starting the motor. At the same time, the counter-clockwise rotation of the lever 523 carries an ear 525 on the right end thereof upward out of engagement with the main clutch 10, permitting the latter to engage and rotate the accumulator shaft 551 and the counter register shaft 553, the accumulator shaft rotating in minus direction. The clutch 10 is similar to the clutch of the same number shown in Fig. 3 in the Avery Patent Number 2,162,238, issued June 13, 1939, to which reference is made for details of construction.

The operator may release the key 506 immediately without stopping the clutch 10, since the ear 525 will ride on the disc 12 of the clutch until the latter has completed a revolution, at which time the spring 570 on the lever 523 rocks the latter clockwise to draw the ear 525 into the notch of disc 12, which functions to disengage a pawl 11 from the ratchet 14 of the clutch to disengage it.

Depression of the plus key 505 starts the motor and engages the main clutch in exactly the manner described in connection with the minus key 506, by virtue of an ear 521 on one key stem 508 of key 505, the ear being closely positioned to the ear 539 of the minus key and directly above the end 522 of the lever 523.

In "addition," depression of the plus key actuates the lever 567 into counter-clockwise position to reverse the direction of rotation of the accumulator shaft 551 and the counter register shaft 553.

The plus key 505 is mounted on two key stems 507 and 508, which are guided by slots in a top plate 518 and are pivotally connected to two parallel bell cranks 514 and 515 rockable about stationary studs 516 and 517, respectively. These bell cranks 514 and 515 have downwardly extending arms connected by studs 562 and 563 to a link 561. Stud 563 also engages a slot 574 in the left end of a link 576, the right end of the link being pivotally connected to the upper end of a lever 564 secured to the shaft 566, to which the reversing lever 567 is also secured.

When key 505 is depressed, link 576 (Fig. 3) is pulled toward the left and levers 564 and 567 are rocked counter-clockwise, conditioning the drive for rotating the accumulator shaft 551 in counter-clockwise or plus direction.

The ear 525 of lever 523 rides on the periphery of the clutch disc 12 and cannot move downward until it approaches the notch in the disc at the end of the cycle, at which time the spring 570 rocks the control lever 523 clockwise, to disengage the clutch and raise the key 505 by contact of the end 522 of lever 523, with the ear 521 on the key. Thereafter, a spring 575 restores the lever 567 to normal or minus position, as shown in Fig. 3, the lever being retained in plus position during the cycle by an interlock, next to be described.

Reversing mechanism interlock

The reversing lever 567 (Fig. 3) is held in one or the other of its two extreme positions, as long as the clutch 10 is engaged, so that there can be no possibility of reversal of the mechanism during the cycle. To this end a lug 571 on reversing link 576 cooperates with an ear 572 formed on the clutch control lever 523 in such position that during initiation of a negative operation by depression of the minus key 506 the ear 572 moves upward in front of the lug 571 to prevent forward movement of link 576. On the other hand, during initiation of a plus cycle (by depression of the plus key 505) the reversing link 576 is moved forward (to the left in Fig. 3) before the ear 521 on key 505 engages the end 522 of lever 523, so that by the time the latter is rocked counter-clockwise, the tip of lug 571 has passed to the left of ear 572, and as the key 505 is depressed further, the ear 572 begins to rise, and the lug 571 continues to move to the left, thus rocking the ear 572 upward just clear of the diagonal surface 572 on lug 571, until the ear 525 is completely raised and the clutch is engaged. Thereafter, during the main clutch cycle, the ear 572 remains behind the lug 571 and prevents rearward movement of the link 576 until the approximate time of clutch disengagement.

The slot 574 in the reversing link 576 is provided to permit return movement of the key 505 by the lever 523, before the reverse lever 567 and the reverse link 576 return to their normal positions, as shown in Fig. 3.

DIAL CLUTCHES

The construction of the accumulator dial clutches and the counter register dial clutches is the same, and they will be described with reference to Fig. 4, which discloses one of the accumulator clutches, mounted on the accumulator drive shaft 551. As shown in Fig. 4, the shaft 551 is provided with longitudinal teeth or splines, the teeth being turned down at the ends in order to pin or otherwise secure the drive gear 550 (Fig. 2) to the shaft.

Each clutch assembly includes a centralizer disc 585 (Fig. 4) secured to the associated dial 500, and a notched disc 586. The centralizer disc 585 has a pair of studs 587 and 588 extending rearwardly therefrom (with reference to Fig. 4) and the notched disc 586 has a pair of studs 590 and 591 extending rearwardly therefrom.

The centralizer disc 585 is positioned in front of the notched disc 586, but the latter has clearance holes therein (one of which is indicated at 592) through which the studs 587 and 588 extend, these clearance holes permitting limited relative rotation between the two discs. Pivotally supported on the two studs 587 and 588, in a plane immediately back of the notched disc 586 are two pawls 595 and 596, respectively, which pawls are urged into engagement with the teeth of shaft 551 by a spring 597, but can be rocked out of engagement with the shaft by rotation of the notched disc 586 relative to the centralizer disc 585, which relative rotation forces the studs 590 and 591 on the notched disc against the pawls 595 and 596. Thus, as shown in Fig. 4, the stud 590 is directly engaging and lifting the nose of pawl 596 and the stud 591 is bearing against the tail 598 of the pawl 595. Furthermore, the centralizer disc 585 is yieldably held against rotation by a nose 605 of a centralizer 600 which is yieldably pressed into a notch of the disc 585 by an S-shaped toggle spring 601 tensioned between a stud 602 mounted on a lower arm 603 of the centralizer, and a stationary stud 604.

The spring 597 urges pawl 596 counter-clockwise about its supporting stud 588 so that with the parts in the position shown in Fig. 4, the nose of the pawl urges the stud 590 toward the left, tending to rotate the notched disc 586 counter-clockwise. Likewise, the pawl 595, under the urge of the same spring 597 forces its tail 598 against the stud 591, which also urges the notched disc counter-clockwise. However, the notched disc 586 is prevented from such counter-clockwise movement relative the centralizer disc 585, by engagement of an ear 607 of a clutch dog 608 with the upper edge of a notch 509, and the clutch unit is thus locked in a tensioned, disengaged position as long as the ear 607 remains in the notch of disc 586.

If the dial 500 were the same digital position but the previous rotation had been in the reverse (clockwise) direction, the ear 607 of the clutch dog would have seated in the next adjacent clockwise notch of disc 586 against the edge 609 thereof. Therefore, although the centralizer disc 585 and the dial 500 would be in the position shown in Fig. 4, the notched disc 586 would be displaced approximately 24° counter-clockwise from the position shown in Fig. 4, so that the stud 590 would be blocking clockwise movement of pawl 595 and the stud 591 would be blocking the tail 594 of pawl 596.

In other words, following counter-clockwise movement, the stud 590 engages the pawl 596 to disengage it from the drive shaft, and stud 591 engages pawl 595 to disengage it from the shaft, whereas following clockwise movement of the dial the stud 590 functions to disengage the pawl 595 and the stud 591 functions to disengage pawl 596.

*Accumulator clutch engagement*

To engage the clutch, the clutch dog 608 (Fig. 4) is rocked counter-clockwise by means to be described later. This carries the ear 607 out of the notch in the notched disc 586, whereupon the spring 597, acting through the pawls 596 and 595 and the studs 590 and 591 rocks the notched disc 586 counter-clockwise with respect to the centralizer disc 585, permitting the pawl 595 to rotate clockwise on its stud 587 into engagement with the shaft 551, and permitting the pawl 596 to rock counter-clockwise on its stud 588 to also engage the accumulator shaft, whereupon the entire clutch assembly and the dial 550 rotate with the shaft.

It will be observed from Fig. 6 that the pivotal axis of pawl 595 is so positioned that the tooth face 551a with which that pawl engages when the shaft 551 is rotating clockwise, is substantially normal to a line drawn from the pivotal axis of the pawl to the contacting face 551a so that pawl 595 effects driving engagement between the shaft and the clutch when the shaft is rotating in clockwise direction. On the other hand, a line drawn from the pivotal axis of the pawl 596 through the pawl tooth face 551b of shaft 551 is substantially perpendicular to the tooth face 551b so that pawl 596 effects driving connection from the shaft 551 to the clutch when the shaft is rotating in counter-clockwise direction. By providing two complementary pawls as shown, instead of only one pawl, the pawls can be shaped to provide wedge noses capable of fitting into the angular grooves of shaft 551. Such a structure provides for positive engagement of the clutch even at high rotative speeds of shaft 551.

Thus it will be observed from an inspection of Fig. 6 that irrespective of the direction of rotation of the shaft 591 one of the pawls 595 or 596 can start to move into engaging position as soon as the tooth in advance of the tooth to be engaged has passed the nose of the pawl. In other words, each of the pawls has substantial time to move from disengaging to engaging position, thereby providing positive clutch engagement at relatively high rotative speeds of shaft 551.

Rotation of the centralizer disc 585 forces the centralizer 600 to rock counter-clockwise until the nose 605 thereon is clear of the lobes of the centralizer disc. This rocking motion is sufficient to bring the stud 602 into a position barely past the center line between the stud 604 and the shaft 615 and render the spring 601 ineffective to restore the centralizer into engagement with the centralizer disc. An ear 616 on a stationary bracket serves as a limiting stop for the centralizer and restrains the latter in the position barely past the center line mentioned.

*Accumulator clutch disengagement*

The clutch having been engaged as last described, the entire clutch assembly and the dial continue to rotate until the clutch is disengaged and disengagement is effected by clockwise rotation of the clutch dog 608 by clutch control apparatus to be described later.

Initial clockwise rotation of the dog 608 causes an ear 612 thereon to engage the centralizer 600 and rock it clockwise past its dead center position whereupon the toggle spring 601 snaps it further clockwise to bring the nose 605 against the centralizer disc 585.

The clockwise movement of the clutch dog 608 causes the ear 607 thereon to engage one of the notches of the notched disc 586 and positively stop further rotation thereof. Thereafter continued rotation of the clutch dial and the centralizer disc 585 causes the studs 590 and 591 to cam the pawls 595 and 596 out of engagement with the shaft 551. By the time the noses of the pawls have been carried clear of the shaft 551, the nose 605 of the centralizer 609 drops to the bottom of one of the valleys in the centralizer disc, yieldably restraining the latter and the dial in centralized position.

ACCUMULATOR CLUTCH CONTROL

As previously indicated, each dial clutch is engaged or disengaged by rocking its associated clutch dog 608 (Fig. 4) either clockwise or counter-clockwise, respectively. The arrangement is such that each of the clutch dogs 608 is mechanically, power-rocked counter-clockwise into a clutch engaging position early in each cycle (unless its associated rocking mechanism has been previously disabled), and is individually selectively rocked clockwise into clutch disengaging position by disabling means including electrical elements controlled by the keyboard of the machine.

*Mechanical control for engaging the clutches*

The clutch dogs 608 (Fig. 4) are rocked counter-clockwise (to engage the clutches) through engagement of an arm 650 on the lower end of each dog 608 by an ear 648 on a lever 645 (Fig. 5), which lever is rocked clockwise by a hook 637 on an arm 636 (Fig. 4) keyed to a shaft 635. Shaft 635 is common to all the orders of the machine and is rocked clockwise early in each cycle by an arm 630 (Fig. 11) thereon, the arm having a roller 631 engaging a dial clutch engaging cam 626, which is secured to the main clutch driven member and has a rise 627 that performs the aforementioned rocking of shaft 635 shortly after the beginning of the clutch cycle, and maintains the shaft 635 in rocked position during about three-fourths of the digitation phase of the cycle. During this period, each clutch can be disengaged at a selected time, dependent upon the selected amount to be registered on its particular dial, by means to be described later, which disconnects the clutch controls from the shaft 635.

The dial clutch engaging cam 626 is driven from the main clutch by a mechanism shown in Figure 2. Thus the main clutch disc 12 has an integral hub 620 which is journaled in a bearing 621 secured to a machine frame plate 622. Thus hub 620 is secured to a collar 624 (for positioning the clutch laterally in the machine) and to a shaft 625 by a screw 623. The shaft 625 supports and drives the cam 626.

If any clutch dog 608 has not been restored clockwise into clutch disengaging position by the electrical control apparatus to be described later, such dog is released shortly prior to the completion of the cycle by counter-clockwise rocking of the shaft 635 (Fig. 4) which results when the roller 631 (Fig. 11) drops off the rise on the dial clutch engaging cam 626. The length of this rise on the cam 626 is such, relative to the speed of rotation of the dial shafts, that any dial which is both clutched to its shaft and declutched from its shaft by the cam 626 will move through nine digits. It will therefore be apparent that it will only be necessary to provide electrical declutching control when the value of the digit to be entered in a dial is less than nine.

*Electrical control for disengaging clutches*

Electrical disengagement of any clutch (Figure 4) is effected by energizing a magnet 660 associated with that clutch. Each magnet 660 has associated therewith an armature plate 658 secured to an arm 657 pivoted on a shaft 759. Arm 657 has a roller 656 on the left end thereof which normally rides on the right end or tail 655 of the latch 637, so that downward movement of the arm 657 by the armature plate 658 in response to energization of the magnet 660, rocks the latch 637 clockwise to disengage the hook 634 on the left end thereof from the ear 647, permitting the spring 639 to restore the lever 645 counter-clockwise into normal position shown in Fig. 5. This permits the spring 651 (Figure 4) to restore the clutch dog 608 clockwise into clutch disengaging position, as shown in Figure 4.

The upper surface of the tail 655 of latch 637 (Figure 5) is arcuate and normally concentric with respect to the shaft 635, so that the angular position of the latch 637 with respect to shaft 635 does not affect the operative relation between the tail 655 and the roller 656, and counter-clockwise rocking of the arm 657 releases the hook 634 from the ear 647 regardless of whether or not latch 637 has been rocked by shaft 635. If the arm 657 is held down by magnet 660 during the clockwise rocking of shaft 635 then the clutch is not engaged at all; this action occurs in case of a "zero" set up, to be described later.

ELECTRICAL SELECTION

It will be apparent from the foregoing description that in order to obtain digitation of a dial 500 for a significant digit less than nine, it is necessary to correctly time the energization of the associated magnet 660, and to accomplish this a timing switch is provided in the supply line to the magnet 660, which timing switch is driven in timed relation with the accumulator shaft. This timing switch, in conjunction with electrical selection switches actuated by the keys 100 (Fig. 1), controls energization of the magnet 660 during the digitation phase of each cycle of operation.

*Selection keys*

A portion of the keyboard is shown in Fig. 3, and it will be observed that the keys 100 cam a selection bar 120 rearward an amount proportional to the normal value of the key depressed. The link 122 supporting the selection bar has a brush 510 insulatingly mounted on its lower end, which brush is adapted to make contact between a contact strip 511 and any one of nine contact pins 512, all mounted on an insulating plate 513. The series of contacts 512 correspond to the "0" to "8" keys 100, and the operation of the key section is such that if the "0" key is depressed the brush 510 remains in the normal position shown, whereas, if the "8" key is depressed the brush 510 moves to the right to connect the strip 511 with the #8 contact 512. If the "9" key is depressed, however, the brush 510 is moved beyond the #8 contact, and, as has been explained hereinbefore, no electrical connection is necessary to effect a "9" digitation. Connection of the strip 511 to any one of the contacts 512 closes selection circuits for controlling the accumulator unit in a manner which will be fully explained later.

Any key 100, after being depressed, is locked down until released either by depressing another key in the same order, or a "keyboard clear" key 101 (Figure 1).

Actuator timing switch

As was explained in the description of the dial shaft driving mechanism (Figure 2) the shaft 542 is driven with the main clutch 10 whenever the latter is engaged. The left end of shaft 542 (upper end in Figure 2) is keyed, by a keyway 665, to a key member 666 made of insulating material and having a brush 667 mounted on an arm thereon, so that as the shaft 542 rotates the brush 667, the latter connects a continuous contact ring 668 successively to a series of contacts 669, all mounted on a stationary insulating member 663.

Magnet-actuating circuits

Referring now to the upper right-hand corner of the schematic diagram of Figure 13, there are nine of the contacts 669 corresponding respectively to the digital values zero to eight, each of which contacts is connected to the contacts 512 corresponding to the same digital value, in all the different keyboard orders, i. e., the #0 contact 669 is connected to all the #0 contacts 512 in all the keyboard orders, by a bus lead 670, the #1 contact 669 is connected to the #1 contacts 512 by a second bus lead 671, etc. Therefore, if the operator depresses (for example) the #8 key 100 (Figure 3) in the rightmost order, the brush 510 in that order is shifted to the right to connect contact 511 with the #8 contact 512, as indicated at 510a in Figure 13. Thereafter when a cycle of operation is initiated as previously described, the dial in the rightmost accumulator order (XVI) and the brush 667 (Fig. 13) move in timed relation, and when the dial approaches the eighth digital position, the brush 667 closes on the #8 contact 669, completing a circuit from the plus side of the supply line to contact ring 668, thence through brush 667 to the #8 contact 669, through lead 678, #8 contact 512 and brush 510 to the contact 511 in the rightmost keyboard order, thence through a lead 680 and contacts VIII and XVI of a shift switch 800, and over a lead 681 and through switch contacts 683 and 685 to the magnet 660 in the rightmost accumulator order (XVI).

Since the bus leads 670 to 678 are connected in multiple to the contacts 512 in all keyboard orders, the different selection circuits in all orders are successively energized exactly as described with reference to order VIII.

Zero set-up

Engagement of an accumulator clutch is prevented if a zero is set in the associated order of the keyboard, by virtue of the fact that the brush 667 (Fig. 13) reaches the #0 contact 669 very early in the cycle thereby completing the circuit to energize the associated magnet 660 at the same time that the shaft 635 (Fig. 4) is rocked clockwise to effect engagement of the clutch. Therefore magnet 660 rocks the latch 637 clockwise to disengage the hook 634 from the ear 647 before the shaft 635 and lever 645 are rocked to clutch-engaging position.

NEGATIVE ACTUATION

As previously explained, the accumulator shaft 551 is rotated counter-clockwise (Fig. 3) during positive actuation, and clockwise during negative actuation. Depression of the plus key 505 reverses the direction of the shaft, which normally rotates in negative direction. However, the timing brush 667 (Figs. 2 and 13) always rotates in the same direction, so that the number of digital positions through which the accumulator dials rotate always corresponds to the digital value of the keyboard key depressed, irrespective of the direction of rotation of the accumulator dial. For example, suppose that a dial stands at "6," and "2" is to be subtracted from it. With the number 2 set in the keyboard, and the minus key depressed, the accumulator dial rotates in minus direction from "6" to "4" and is left standing at 4.

TENS TRANSFER

In the present machine, tens-transfer is effected by (1) rocking the shaft 635 (Fig. 4) to mechanically engage the accumulator clutches for a single transfer actuation during a transfer phase of each cycle; and (2) energizing magnets 660 to prevent actuation of the clutches (in response to rocking of the shaft 635), if transfer is not desired. This makes possible a simple, electrical control of tens transfer by means of suitable switches actuated according to the position of the dial in the next lower order.

The mechanical means for rocking the shaft 635 during the transfer phase includes a transfer lobe 629 (Fig. 11) on the cam 626 which rocks the follower 630 clockwise near the end of each cycle exactly as it was rocked by the rise 627 at the beginning of the digitation phase. The lobe 629 is very short so that the arm 630 and shaft 635 are held clockwise only long enough to advance the dials one digit.

Figures 10, 11:
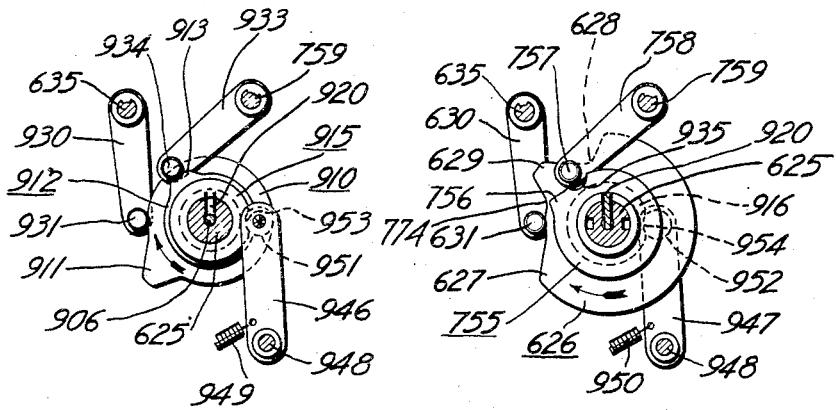
Figure 10 is a right side detail view of certain cams which effect engagement of the clutches during clearance.
Figure 11 is a right side view of the cams which effect engagement of the accumulator clutches for digitation and transfer.

The timing of the dial clutch engaging cam 626 is clearly indicated with reference to the other operations taking place during each cycle, by line 5 in the diagram of Fig. 12, the line constituting, in effect, a linear development of the cam surface and bearing reference numerals corresponding to the reference numerals applied to the cam in Fig. 11.

Electric disabling of the tens-transfer mechanism

Referring to Fig. 13, the circuit to each magnet 660 is normally completed through a movable switch member 685 and its left contact 686 (with reference to Fig. 13) to the keyboard switches 512. These switch members 685 are controlled by a cam (driven by the main clutch) which throws the movable switch members 685 from contacts 686 to contacts 687 at approximately 280° of the main clutch cycle, or just before the transfer phase, each contact 687 being connected to the transfer control circuit.

The actuating means for switch elements 685 is shown in Fig. 8, wherein a cam 690 is driven clockwise by shaft 625 (Fig. 2) from the main clutch 10. A cam follower 693 (Fig. 8) is keyed to a shaft 694 and is normally urged counter-clockwise by a spring 695 to maintain a roller 696 against the cam 690. The shaft 694 also has keyed thereto a plurality of arms 697 (one for each order) having insulated tips 699 cooperating with the movable switch elements 685 in all orders.

Just before the transfer phase of each cycle the rotation of the cam 690 carries a lobe 691 thereon below the roller 696 to rock the cam follower 693, the shaft 694, and all the arms 697, clockwise, to open the contacts 686 and close the contacts 687.

Referring now to Fig. 13, the dials are advanced a transfer increment in all orders except those in which the magnets 660 are energized at the time that the clutch engaging shaft 635 (Fig. 4) is rocked for transfer. Therefore an electrical impulse is transmitted from a timing switch segment 664 (Fig. 13) through the transfer circuits to the magnets 660 at the time in the cycle that the clutch engaging shaft 635 is rocked for transfer, and the transfer circuits contain switches arranged to prevent any magnet 660 from receiving this impulse if the movement of the adjacent lower order dial requires a transfer.

The transfer circuits include a lead 699 extending from the transverse segment 664 of the timing switch, and a lead 700 permanently connected thereto. A single ordinal switch 712, actuated by the lowest order dial, and a set of three ordinal switches 710, 705 and 712, actuated by each of the higher order dials, control the transfer circuits in all orders except the lowest. The switch contact 687 in the lowest order XVI is directly connected to the transfer lead 699 since transfer into the lowest order can never occur.

It will be observed from Fig. 13 that the switch contact 687 in the lowest order is directly connected to one contact of the switch 712 immediately to the left thereof and that the other contact of this switch 712 is connected by a lead 701 to the contact 687 in the next higher order (XV). Likewise, in each succeeding higher order the left terminal of the ordinal switch 712 is connected by a lead 701 to the switch contact 687 in the next higher order. The ordinal switches are so arranged that current may be selectively supplied to any ordinal magnet other than the rightmost, directly from the transfer lead 700 (through the switch 712, switch 705 and its contact 706, or ordinal switch 705 and its contact 707 and switch 710 and its contact 708); or the ordinal switches relating to any ordinal magnet (other than the lowest order) may be positioned to connect that magnet to the ordinal lead 701 extending to the next lower order (through ordinal switch 712, switch 705 and its contact 707, and switch 710 and its contact 709), thus connecting two or more ordinal magnets in a chain so that the transmission of a transfer impulse to all magnets in the chain is controlled by the position of the ordinal magnet in the chain.

It must be kept in mind in tracing the transfer circuits that energization of an ordinal magnet 660 prevents a transfer into the associated dial.

It will be apparent that whether or not any ordinal magnet 660 (in any order other than the lowest) is energized during the transfer phase (at which time switches 685 are on their contacts 687), depends upon the positions of the three switches 712, 705 and 710 directly to the right of that magnet in Fig. 13, which three switches are controlled by the dial in the next lower order.

The specific mechanisms for actuating the ordinal switches will be described later. For the present, it will suffice to state that (A) Any switch 712 is open if the dial to the right thereof (with reference to the schematic diagram of Fig. 13) during the digitation phase, moved in positive direction through nine, or moved in negative direction through zero. Under all other conditions switch 712 is closed;

(B) Any switch 705 is down during negative actuation, or if the dial to the right thereof stands at nine at the end of the digitation phase. Any switch 705 is up if actuation is positive, and the dial to the right thereof is left standing at zero to eight, inclusive, at the end of the digitation phase;

(C) Any switch 710 is down if actuation is positive or the dial to the right thereof was left standing at zero at the end of the digitation phase. Switch 710 is up if actuation is negative and the dial to the right thereof was left standing at one to nine, inclusive, at the end of the digitation phase.

By causing each dial to control the ordinal switches 705, 710 and 712, in the transfer circuit of the next higher order dial, in the manner described, the transfer circuits will be conditioned to effect the proper transfers under all possible conditions of operation, as can best be explained by describing several different specific problems with reference to Figs. 14, 15, 16 and 17.

*Positive single transfer*

Referring first to Fig. 14, the first line of figures above the circuit diagram represents the numbers appearing on six accumulator dials after the number 478 has been set therein. The second line indicates that the number 4 has been set up in the keyboard but actuation has not been initiated. The third line represents the positions of the accumulator dials after the plus key 505 has been depressed and the machine has completed the digitation phase of the cycle. The circuit diagram shows the condition of the transfer circuits at the beginning of the transfer phase, and the positions of the dials in the various orders at this stage are shown in the windows 715 of the diagram. Since the XIV dial passed through nine in positive direction during digitation, the switch 712 to the left thereof is open, but the switches 712 in all other orders remain closed. Furthermore, all switches 705 are up and all switches 710 are down because the operation is in plus direction and no dial is left registering 9. Current therefore flows from lead 699 to the right contact 687 in order XVI, energizing that ordinal magnet 660, and also flows through the switch 712 to the left thereof and through the ordinal lead 701 of the next ordinal magnet in order XV, energizing that magnet. Current is supplied to ordinal magnet XIV from the lead 700 through switch 705 and switch 712 immediately to the right thereof. The ordinal magnet XIII is not actuated, however, since the switch 712 to the right thereof is open by virtue of the fact that dial XIV passed through nine in positive direction. Therefore, transfer will be effected in dial XIII to register the digit 8 in that dial after transfer, as indicated in line 4 above the diagram. Circuits are closed to all the remaining magnets from line 700 through the switch 712 and the switch 705 to the right of each magnet, so that dial XIII is the only one to receive a transfer.

*Positive chain transfer*

The second example, shown in Fig. 15, involves the addition of one to the number 26999 already entered into the accumulator register, as shown in line 1 at the top of the diagram. As shown in the third line, and in the square 715 of the diagram, the 1 has been added in the dial XV, causing the latter to read "0" but no transfer has yet been effected.

Referring now to the circuit diagram, it will be observed that the switch 712, to the left of dial XV, is open because dial XV passed from nine to zero in positive direction during the digitation phase; but all the other switches 712 are closed. All the switches 710 are down because the direction of rotation is plus. The switches 705 are down in all orders standing at "9" and are up in all other orders. The XVI magnet is, of course, energized directly from lead 699 and the XV magnet is energized over its ordinal lead 701, since the switch 712 to the right is closed. However, magnet XIV is not energized because switch 712 to the right thereof is open; magnets XIII and XII are not energized because, although switches 712, to the right thereof, are closed, the switches 705 and 710 to the right of each of these magnets, are in their down positions, since magnets XII, XIII and XIV, are not energized, the dials in those orders are all actuated for a transfer.

Negative single transfer

The third example shown in Fig. 16 involves the subtraction problem "826573—8004", which involves a single negative transfer, commonly referred to as "borrowing" which occurs when a digit is subtracted from a smaller digit, thereby causing the dial to pass through zero.

Referring to the circuit diagram of Fig. 16, it will be observed that all the switches 712 are closed excepting those to the left of the two orders XIII and XVI. In those two orders the dials have passed through zero during the actuating cycle, thereby opening the ordinal lead 701 to the next adjacent higher orders XII and XV, respectively, to prevent actuation of the magnet 699 in those orders and enable engagement of the clutches to subtract an additional digit from each dial.

In each of the other orders XI, XIII and XIV, the magnet 699 is energized from lead 700 through the switches 712, 705 and 710 immediately to the right of that magnet, in Fig. 16.

Negative chain transfer

The fourth condition is shown in Fig. 17, involving the subtraction problem "6004—6," which problem necessitates borrowing through three orders simultaneously.

Therefore, at the beginning of the transfer cycle, the dial XV, having passed through zero in the digitation phase, has opened the switch 712 to the left thereof. However, since no other dial passed through zero during the digitation phase, all of the remaining switches 712 are closed. Furthermore, all switches 705 are down because the operation is negative, and all the switches 710 are up except in orders XI, XIII and XIV, where the dials stand at zero. The magnet 699 in the XVI order is always connected to the transfer lead 698 during the transfer phase by its switch 695 because no transfer is ever received in the rightmost order, and since in the case of the present example the numeral wheel in the XVI order did not pass from 9 to 0, its switch 712 is closed; therefore, magnets 699 in orders XV and XVI are energized over their leads 701 and 699, and the magnet in order XI is energized over the switches 712, 705 and 710 from lead 700, to prevent transfer in orders XV, XVI, and XI. But transfer is effected in order XIV because the circuit to the magnet in that order is open at the switch 712 to the right thereof, and chain transfer takes place in orders XIII and XII because the ordinal leads of those magnets are connected to the ordinal lead of the magnet in order XIV, which is open at switch 712.

Means for actuating transfer switches 712

As previously noted, the switch 712 (Fig. 13) in any order is always closed during the transfer phase of each cycle unless the dial in that order moved in positive direction through nine or moved in negative direction through zero, during the digitation phase of the cycle. Means is therefore provided for closing each switch 712 very early in each cycle and then opening the switch during the digitation phase if and when the dial passes from "9" to "0" or vice versa.

One of the switches 712 is illustrated in Fig. 4 and, as shown, it is normally maintained in open condition by an insulated tip 769 on a lever 760, which lever is urged in direction to open the switch 712 by a spring 762. All of the lever 760 in all the different orders are loosely keyed on a common shaft 759 so that each lever can rock clockwise about the shaft 759 but will also be forcibly rocked clockwise by clockwise rotation of the shaft.

The common shaft 759 has an arm 758 (Fig. 11) keyed thereto, which arm has a cam follower roller 757 cooperating with a cam 755, which cam is normally keyed to the shaft 625 (Fig. 3), and which rotates clockwise whenever the main clutch is engaged. Very early in each cycle a lobe 756 on the cam 755 engages the roller 757 and rocks the shaft 759 clockwise, which rocks (Fig. 4) all of the lever 760 clockwise to close the contacts 712. Furthermore, the lever 760 in each order is locked in clockwise position by counter-clockwise movement of a latch 765, this movement causing a shoulder 764 on the latch to engage an ear 761 on the lever 760 and prevent counter-clockwise return of the lever. Latch 765 is freely rotatable on the shaft 615 and is urged counter-clockwise by a spring 766. In any order in which the dial does not pass from nine to zero, or vice versa, during the digitation phase, the lever 760 remains in clockwise position, in which the associated switch 712 is closed. However, if any dial moves from nine to zero, or vice versa, the pin 588 on that dial engages a nose 770 on the latch 765, camming the latter clockwise to disengage the shoulder 764 thereon from the ear 761 on the associated lever 760, permitting the latter to rock counter-clockwise and open its associated switch 712. Those members 760 which were not tripped remain latched and only those which were tripped will again be rocked clockwise and latched at the beginning of the next cycle.

Means for actuating transfer switches 705

As will be remembered, the switch 705 in each order is down if the dial to the right thereof moved in negative direction or was left standing at "9," and is up if the dial to the right moved in the positive direction and was left standing at zero to eight, inclusive. The switch 705 and its associated contacts 706 and 707 form part of a switch assembly 742 (Fig. 7) and switch 705 is adapted to be actuated by one or the other of two insulated tips 741 and 746 on the noses of an arm 740 and a lever 745, respectively, both of which are rotatable about the axis of a common shaft 615, which is common to all the orders.

The lever 745 is responsive to the position of the dial in the associated order, and arm 740 is responsive to the direction of rotation of the dails so that between them the lever 745 and arm 740 actuate the switch 705, as previously outlined. The mechanism for actuating the lever and arm will now be described.

The lever 745 in each order has a follower roller 748 which rides on a cam 750, which is connected to the associated dial for rotation therewith by the pin 588 (previously described with reference to Fig. 4). This cam 750 has a dip 752 so oriented with respect to the dial that it permits the lever 745 to be rocked clockwise (by a spring 747) when the dial displays "9," thereby moving switch 705 into down position. It is apparent, therefore, how contact 705 is in down position whenever the associated dial is displaying "9," irrespective of the direction of rotation of the dial.

The arms 740 in all orders are in counter-clockwise position, in which they leave switches 705 in normal or "up" position whenever the direction of operation is positive, but move clockwise to shift the switches 705 into "down" position whenever the direction of operation is negative. To this end the arms 740 in all the orders are all keyed to the common shaft 615, which shaft (Fig. 9) also carries an arm 730 having a forked end engaging a pin 726 in a lever 722 rotatable on a stud 723 and urged into the neutral position shown in Fig. 9 by a spring 725. This lever 722 has an ear 724 thereon engaging a notch 721 of a cam 720, which cam is integral with the gear 546 (Fig. 2) and is therefore driven counter-clockwise during positive actuation and clockwise during negative actuation.

It will be apparent that during positive actuation the cam 720, very early in the cycle, rocks the lever 722 clockwise, which in turn rocks the arm 730, shaft 615, and the arms 740 (Fig. 7) counter-clockwise so that the insulated tip 741 is clear of the switch 705, leaving the latter in "up" position. On the other hand, if actuation is negative, then (Fig. 9) the clockwise rotation of cam 720 rocks the lever 722 counter-clockwise, which rocks the arm 730, shaft 615, and (Fig. 7) arms 740 clockwise to shift the switches 705 into "down" position.

Means for actuating transfer switches 710

The switches 710 in each order are also actuated by the lever 745 and the arm 740 in that order. The movement of switch 710, as the switch is actually constructed (Fig. 7), is exactly opposite in direction to the schematic circuit diagram of Fig. 13. In other words, with reference to Fig. 7, switch 710 is "up" if the associated dial moved positive or was left standing at "0," but is down if the dial moved in negative direction and was left standing at 1 to 9.

It will be obvious from the previous description that switch 710 will always be held up by the arm 740 during positive actuation. Likewise, it will be held up by the lever 745 when the dial is set at "0" position, because at that time a lobe 751 on cam 750 rocks the lever 745 counterclockwise as shown in Fig. 7. On the other hand, in all other positions of the dial the lever 745 is not rocked counter-clockwise sufficiently to raise the switch 710.

It might be added that except when the dial is in "0" position with the roller 748 resting on the lobe 751 or in "9" position with the roller 748 resting in the dip 752, the roller 748 rides on the normal surface 753 of the cam, under which condition the arm 745 is in intermediate position, in which it does not affect either switch 705 or 710.

MACHINE TIMING

The relative timing of the various controls which effect engagement and disengagement of the accumulator clutches during the digitation and transfer cycles, is graphically shown in Fig. 12, in which:

Line 1 shows the angular movement in degrees of the movable timing switch contact 667 (Fig. 13);

Line 2 shows the relative positions of the stationary contacts 669 of the timing switch;

Line 3 shows the angular movement in degrees of the accumulator dial shaft 551 during a cycle.

It will be observed that whereas the timing contact moves 360° during each cycle, the dial shaft rotates 468°, making the ratio of movements 10 to 13. This ratio is obtained by the gear train (Fig. 3). Thus, whereas timing contact 667 (Fig. 2) is driven by the main clutch through gears 540 and 541 of the same size, shaft 551 is driven through gears 546 having 39 teeth and gear 550 having 30 teeth, thereby making the 10 to 13 ratio.

Line 4 shows the dial timing. It will be observed by checking line 4 against line 3 that in case of a "9" digitation and a transfer, the dial is rotated 360° starting at 64° of rotation of the dial shaft and stopping at 388° (making an advance of 324°) and then starting transfer movement at 425° and ending transfer movement at 461°, or an additional advance of 36° which added to the 324° makes the total 360° or one revolution.

Line 5 of Fig. 12 is a development of the cam 626 (Fig. 11) showing at just what times in the cycle the rise 627, the dip 628, and the transfer lobe 629 come into action.

In the lower portion of Fig. 12, below line 5, the three diagrams A, B and C, respectively, are provided for graphically showing the timing of the movements of the clutch dog 608 (Fig. 4), the clutch pawls 595 and 596, the centralizer 600, and the latch 637 which is controlled by the magnet 660.

First example: Zero with transfer

In the example illustrated in group A of Fig. 12 no value, or "0" is set up in the keyboard, but a transfer is received from a lower order accumulator unit. In this event, the zero contact (Fig. 13) energizes the magnet 660 (Fig. 4) to rock the latch 637 at 771 (line 9) and hold the latch in disengaged position during the clutch engaging period of the cycle whereby the rise 627 (line 5) of the clutch dog cam 626 is prevented from moving the clutch dog (line 6) to clutch-engaging position during the digitation phase. However, just before the transfer period (line 4) the clutch dog cam 626 (line 5) dips at 628 so as to permit the latch 637 (Fig. 4) to reengage the ear 647 if the magnet 660 is not energized at that time. In the present instance the magnet is not energized because the switch 712 (Fig. 13) has been opened by the dial in the next lower order. Therefore, the latch 637 engages the ear 647 (Fig. 4) at point 628 in line 5 of Fig. 12, and when the latch 637 is again rocked by the rise 629 of cam 626 (line 5) it rocks the clutch dog at 772 (line 6), to release the clutch pawls at 773 (line 7) causing the latter to begin to drive the dial at approximately 425° of the dial shaft rotation (line 3). However, shortly thereafter the cam 626 (line 5) drops off at 774 to release the clutch dog at 775 (line 6) which begins to rock the clutch pawls into disengaging position at 777 (line 7). The centralizer (line 8) is rocked at the beginning of the dial movement and rocks back to centralize the dial at the completion of digitation, as shown by the shaded portion of line 8.

The mode of operation of the pawls 595 and 596 (Fig. 4) is minutely indicated in line 7 of Fig. 12. When the clutch dog 608 (Fig. 4) approaches completion of its outward movement, as indicated at 772 in line 6 (Fig. 12), the pawls 595 and 596 (Fig. 4) are released, whereupon they drop on top of moving teeth of the shaft 551. This interrupts the engaging movement of the pawls, as indicated at 776 in line 7, until the teeth pass the noses of the pawls, permitting them to drop completely into the next following grooves of the shaft 551, as indicated by the drop (line 7) following the point 778. The pawls are tripped a little early to insure proper engagement of the clutch in spite of backlash or possible minor variations in timing between the control cams and the dial shaft.

It will also be noted from line 9 that following return movement of the clutch dog, which starts at point 775 in line 6, there is a pause at point 779 as the ear 697 (Fig. 4) on the clutch dogs drop onto a raised portion of the notched disc 586 and is held momentarily before dropping into a notch of the disc to disengage the clutch.

*Second example: Six without transfer*

In Example B (Fig. 12), a value of 6 is entered into the dial during the digitation phase of the cycle and there is no transfer. Therefore the magnet 660 is not energized until the No. 6 contact (line 2) is reached, and the cam 626 (line 5) rocks the clutch dog (line 10) out at 780 to release the clutch pawls (line 11) at point 781, whereupon they engage the accumulator shaft and begin to drive the dial at the time indicated by zero in line 4. The centralizer 605 likewise is rocked out at this time, as indicated at 782 in line 12.

The dial continues to rotate until the magnet 660 is tripped by current received over the No. 6 contact (line 2). It will be noted that the No. 6 contact (line 2) is located some distance ahead of the No. 6 dial position (line 4) so that the latch 637 is tripped at 785 (line 13) and the clutch dog is released at 786 (line 10) to rock the clutch pawls (line 11) to disengaging position at 787, and to rock in the centralizer (line 12) at 788 and stop the dial after it has been driven through six digital increments.

In this example, where no transfer is effected, the transfer circuit is closed through the transfer contact (line 2) and the associated switch 712 (Fig. 13) to the magnet 666, so that when the cam dips at 628 (line 5) to allow the magnet latch 637 (Fig. 4) to hook on to the ear 647, the magnet armature 657 engages the latch 637 at time 789 (line 13, Fig. 12) and prevents the latch from hooking on to the ear 647 (Fig. 4), thereby preventing engagement of the accumulator clutch.

*Third example: Nine with transfer*

In the example illustrated at C in Fig. 12, the electrical controls do not come into play at all, and the magnet 660 is not energized at any time in the cycle, as shown by the straight line representing the latch movement in line 17. This is because the contact 510 (Fig. 3) moved beyond the #8 contact in response to depression of the No. 9 key 100, and no selection circuit is closed. Therefore when the cam 626 (line 5, Fig. 12) rises at 627 the clutch dog (line 14) and the clutch pawls (line 15) are rocked to clutch-engaging position in exactly the same way as explained in connection with Example B so as to start driving the dial at point 790 (line 16) where the centralizer begins to rise. When the cam 626 (line 5) drops off at 628, it releases the clutch dog (line 14) which, at point 791, begins to rock the pawls (line 15) outwardly to disengage the accumulator clutch at 792, in line with the #9 (line 4) position where it is held by the centralizer (line 16). However, as the cam 626 again rises to 629 (line 5), it again rocks the clutch dog at point 795 (line 14) to allow the pawls (line 15) to drop back in and begin to drive the dial at 796, rocking the centralizer (line 16).

The cam 626 (line 5) immediately drops off at 774 to effect disengagement of the clutch after the transfer actuation, in the same manner as explained in connection with the transfer in Example A.

SHIFT SWITCH

The dials in the present embodiment are not mechanically shiftable in the machine, but the ultimate effect of mechanical shifting is obtained with the shift switch 800 (Fig. 13) which is inserted in the circuits between the keyboard selection switches 509 and the accumulator clutch magnet 660. As shown schematically in Fig. 13, the shift switch consists of a movable disc 801, made of insulating material and having a group of eight contacts 802 that are permanently connected to the eight keyboard orders I to VIII by means of eight leads (such as leads 680 extending from the VIII contact 802 to the VIII contact 511). The eight contacts 802 cooperate with sixteen stationary contacts 805 connected to the magnets 660 by sixteen leads (such as the leads 681 extending from the XVI contact 805 to the XVI magnet 660).

The movable member 801 of the shift switch also carries a single contact 806 which is connected to the No. 1 bus lead 671 by a lead 807. This contact 806 cooperates with eight stationary contacts 810 permanently connected to the counter register magnets by eight lead 811. These counter register magnets are not shown in the wiring diagram but for the purpose of the present description, it is sufficient to explain that the counter register circuit is a duplicate of the accumulator register circuit shown at the bottom of Fig. 13.

Normally, the disc 801 stands in its extreme clockwise position at the beginning of a problem, which happens to be seven positions clockwise from the position shown in Fig. 13. In normal position the movable contact 806 engages the I contact 810, and the eight contacts 802 engage the II to IX contacts 805. During a calculation such as multiplication (with a multiple digit multiplier), the disc 801 is shifted one position counter-clockwise after multiplication by the first multiplier digit is completed, which moves contact 806 to the II contact 810 and moves the contacts 802 so as to cooperate with the III to X contacts 805. If the multiplier contains more than two digits the disc 801 is again shifted one position counter-clockwise after multiplication by each successive multiplier digit is completed.

To prevent actuation of any dials in "offboard" accumulator orders, i. e., those orders of the accumulator register which are not electrically connected to the keyboard selection switches, and to prevent actuation of any of the counter registers except the one connected to the signal controlling contact 806, it is necessary to supply current to the magnets 660 in those orders. For this purpose two arcuate contacts 812 and 813 are provided on the movable disc 801 to cooperate with the contacts 805 and 810 and these arcuate contacts are connected to the #0 bus lead 670 by a lead 814, so that all offboard dial magnets receive a zero impulse from the zero timing switch contact 669 to prevent engagement of the associated dial clutches during digitation.

*Structure of shift switch*

Referring to Figs. 19, 20 and 21, the stationary part of the switch 800 is composed of three discs 820, 821 and 822 made of insulating material and riveted to a machine frame plate 823 by three rivets 824. Projecting from the disc 820 are the sixteen contacts 805 and the eight contacts 810. These contacts are urged toward the right (Fig. 20) by springs 825 compressed in apertures in the disc 821, and are guided by smaller apertures in the discs 820 and 822.

The movable insulating disc 801 is secured to the flange of a hub 826 by three rivets 827, which hub is mounted for rotation with a shaft 829. Embedded in the disc 801 are the eight contacts 802, the contact 806 and the two arcuate contacts 812 and 813, all of which have flexible leads (not shown) extending therefrom to complete the circuit connections thereto (Fig. 13).

Shift-key 830

The shift key 830 (Figs. 1 and 18) rotates the shaft 829 (Fig. 20) and shifts the movable disc 801 one increment clockwise (Fig. 13) in response to each depression of the key.

Referring to Fig. 18, the key 830 is mounted on a key stem 831 which is guided for vertical movement by a stationary stud 832 and a slot in the top cover 833. A pawl 835 is mounted on the key stem 831 by a stud 836, and is urged counter-clockwise by a torsion spring 837. An ear 840 on the pawl engages one of a series of teeth 841 on a ratchet disc 842 secured to shaft 829. A second series of teeth 843 cooperates with a retaining pawl 845 having an ear 846 and urged clockwise about a stationary stud 847 by a torsion spring 848.

Each time the key 830 is depressed, ear 840 rotates the disc 842 and the movable member of the shift switch one step counter-clockwise, and pawl 845 retains the disc 842 in its advanced position while the key 830 is being returned by a spring 849 tensioned between an ear 838 on the key stem and a stationary stud 834.

Shift indicators

The shift indicators 501 and 502 (Fig. 1), previously mentioned, are moved in synchronism with the shift switch to indicate with which orders of the accumulator and counter registers the keyboard is associated. To this end, the shaft 829 (Fig. 18) is extended toward the right of the machine and has a gear segment 850 on the right end thereof, which segment meshes with a gear 851. Gear 851 is integral with a drum 855 having a flexible wire rope 856 wound around it, the free end leaving the drum, passing over a stationary pulley 857 and being secured to a shift indicator carrier 858, on which the two indicators 501 and 502 are mounted. The carrier 858 is supported by a roller 859 for longitudinal movement in a track 860 mounted under the machine cover, and is constantly urged to the left of the machine by a spring 861, maintaining the wire 856 taut.

Shift return key 875

Return movement of the shift switch is effected by the spring 861 whenever the pawls 835 and 845 are disengaged from the ratchet wheel 842, and such disengagement is effected by depressing the shift release key 875 (Figs. 1 and 18).

Key 875 is mounted on a stem 874 supported for vertical movement on studs 876 and 877. The stem has a shoulder 871 overlying an ear 870 on a clear lever 866 pivotally supported on a stud 867 and urged clockwise by a spring 868. Downward movement of the left end of the lever 866 in response to depression of the key 875 causes the lever to engage a pair of ears 864 and 865 on the pawls 835 and 845, respectively, to rock pawl 835 clockwise and pawl 845 counter-clockwise out of engagement with the ratchet wheel 842, thereby permitting the shift indicator and the movable disc of the shift switch to be returned to normal position, as previously indicated.

DIAL CLEARANCE

Briefly, clearance in the present machine is accomplished by engaging all the dial clutches by a special clearance cam which rocks the clutch dogs out only momentarily, after which each clutch dog is held out by an individual latch which is tripped automatically as its dial approaches zero position.

Clearance of the counter dials is effected by depression of the "Lower dials" clear key 880 (Fig. 1) and clearance of the accumulator dials is effected by depression of the "Upper dials" clear key 881. The keys may be actuated one at a time, or simultaneously.

The "Upper dials" clear key 881 for effecting clearance of the accumulator dials 500 (Fig. 1) is mounted on a key stem 882 (Fig. 9) supported for vertical movement on two studs 886 and 887 and normally maintained in raised position by a spring 883 tensioned between an ear 884 on the key stem and a stationary stud 885. The key has an ear 888 overlying an arm of a bell crank 890, pivoted on a stationary stud 891. One arm of the bell crank 890 is connected by a stud 893 to the left end of a link 895, the right end of which link is connected by a stud 894 to the upper end of a lever 896 pivotally supported by stud 524 on which the clutch actuating lever 523 (Fig. 3) is pivoted. The lower end of lever 896 (Fig. 9) is connected by stud 898 to the left end of a link 897, the right end of which is pivotally connected by a stud 899 to the lower end of an accumulator clearance lever 900, which is fulcrumed on shaft 958 and is urged clockwise by a spring 902. Lever 900 has on its upper end an arcuate arm 901 formed as shown in Fig. 2, so that when the lever 900 is maintained in normal clockwise position by the spring 902 the end portion 905 of the arcuate arm 901 holds a pin 906 (Fig. 2) in an inner position, in which a lug 921 of a key 920 in shaft 625 engages a notch in the hub of a dial clutch engaging cam 626 so that the latter is driven with the shaft 625. The key 920 is maintained against the inner end of the pin 906 by a spring (not shown) so that it follows the pin.

The accumulator clearance lever 900 is adapted to assume three different operative positions, one of which (clockwise) has just been described. In an intermediate position of lever 900 an intermediate level 904 (Fig. 2) of the arcuate arm 901 engages the pin 906, permitting the latter and the key 920 to move outwardly into a neutral position in which the lug 921 thereon is moved out of engagement with the notch in cam 626. On the other hand, if the accumulator clearance lever 900 is rocked into counter-clockwise position, it brings a lowest level 903 (Fig. 2) on the arcuate arm 901 juxtaposed to the pin 906, permitting retraction of the key 920 to bring the lug 921 thereon into a notch 922 of a cam 910 to cause the latter to rotate with the shaft 625.

Except during clearance, the key 920 is in the position shown in Fig. 2, coupling the shaft 625 to the integral cams 626 and 755 (previously described with reference to Fig. 11) for controlling the dial clutches during the digitation and transfer phases of each cycle.

Depression of the key 881 shifts the key 920 downward (with reference to Fig. 2) to disconnect shaft 625 from the cam 626 and connect it to the cam 910 formed integrally with a cam 912 and a centralizer disc 915, constituting a unit controlling the dial clutches during a clearance operation.

The two cam units including the cam 626 and the cam 910, respectively, are maintained in proper longitudinal position on the shaft 625 by a flange 917 on the shaft 625, this flange being notched to pass the lug 921 on key 920. When the arm 901 is in intermediate position with the intermediate level 904 of arm 901 resting against the end of pin 906, the lug 921 lies in the notch in flange 917 out of engagement with both the notch in cam 626 and the notch 922 in cam 910, in which position shaft 625 does not drive either cam unit.

Obviously the lug 921 can be shifted only when the notches in the cam 626, flange 917 and cam 910 are in alignment, and centralizing means are therefore provided for normally holding the cam units in neutral position when they are not being positively driven. To this end a centralizer arm 946 (Fig. 10), freely pivoted on a shaft 948, is urged counter-clockwise by a spring 949 to press a roller 951 on the upper end of the centralizer arm against the centralizer disc 915, which has a recess 953 therein that engages the roller 951 when the cam unit is in neutral position. Similarly, the centralizer disc 916 (Fig. 11) connected to the cam 626 has a recess 954 that is engaged by a roller 952 on the upper end of a centralizer arm 947 pivoted on shaft 948 and urged counter-clockwise by a spring 950.

*Engaging the accumulator clutches for clearance*

Depression of the clear key 881 couples the shaft 625 to the clearance cam 910 (Fig. 2) as described, and also engages the main clutch 10 to drive the shaft 625. The lever 896 (Fig. 9) when rocked counter-clockwise by depression of the key 881, carries a shoulder 925 on the upper end portion of the lever against an ear 926 on the main clutch control lever 523 (Figs. 9 and 3) rocking the latter into clutch-engaging position during final downward movement of the key 881. Therefore the clearance cam unit begins to rotate in clockwise direction (Fig. 10).

Very early in the rotation of the clearance cam unit, a lobe 911 on cam 910, bearing against a follower roller 931 on an arm 930 keyed to shaft 635, rocks the shaft 635 to rock the clutch dogs 608 (Fig. 4), to the left and engages all the dial clutches. The dials are thereby started rotating in negative direction, since the accumulator shaft 551 always rotates in negative direction except when the plus key 505 has been depressed.

*Selective disengagement of the accumulator dial clutches at zero*

The lobe 911 (Fig. 10) on cam 910 rocks the shaft 635 to throw out the clutch dogs 608, as described, but immediately thereafter permits the shaft 635 to rock back into normal position, and separate latch mechanisms individual to each dial are brought into action before the restoration of shaft 635, to selectively hold the clutch on each dial until that dial passes into zero position. This latch mechanism will now be described.

Before the lobe 911 (Fig. 10) has passed the roller 931, a lobe 913 on cam 912 passes from below a roller 934 on an arm 933 keyed to shaft 759, permitting the latter shaft to be rocked counter-clockwise by springs 941 (Fig. 4) bearing against levers 940 in all the orders, which levers 940 are loosely keyed to the shaft 759.

Shaft 759 is rocked counter-clockwise through a greater angle during clearance than during digitation, by virtue of the fact that during a clearance operation the roller 757 (Fig. 11) on the arm 758 keyed to shaft 759 is aligned with a notch 935 in the cam 755, which is standing at neutral position during a clearance operation.

The counter-clockwise rocking of the shaft 759 (Fig. 4) through the greater angle as described, permits the lever 940 in each order to be rocked counter-clockwise by its associated spring 941 a distance sufficient to bring a shoulder 943 on each lever below an ear 944 on the associated clutch dog 608, which, at the time, has been rocked into counter-clockwise clutch-engaging position, thereby retaining the clutch dogs in clutch-engaging position independently of the shaft 635.

Each of the levers 940 (Fig. 4) has a nose 945 which, when rocked counter-clockwise, as just described, lies in the path of the stud 588, and is so positioned in the path that as the dial (which is being rotated in negative direction) approaches zero, the stud 588 cams the nose 945 toward the right sufficient to disengage the shoulder 943 from the ear 944, whereupon the spring 651 rocks the clutch dog 608 into clutch-disengaging position, to stop the dial at zero.

The clockwise rocking of each lever 940 is possible without corresponding rocking movement of the associated lever 760 because both lever 940 and lever 760 are loosely keyed on the shaft 759. Furthermore, the keyway in shaft 759 is sufficiently wide, relative to the width of the keys in the levers 760, to permit rocking of the shaft 759 and the levers 940 into the full counter-clockwise position to engage the shoulders 943 against the ears 944, irrespective of the positions in which the levers 760 happen to have been left.

*Counter dial clearance*

It should be kept in mind in the following discussion that the counter register is a duplicate of the accumulator register, which has been described in detail, and reference may be had to the description of the accumulator clutches and controls for details of the counter register not set forth in the following description.

To effect clearance of the counter dials, the "Lower dials" clear key 880 (Fig. 1) is depressed. This key is mounted on a key stem 962 (Fig. 9) and moves a link 963 in exactly the same way the key 881 moves link 895. Link 963 is connected to the upper end of a lever 964 by a stud 965 to rock the lever counter-clockwise about stud 966. The lower end of lever 964 is connected by a toggle linkage, including links 967 and 968 interconnected by a stud 969, to a camming lever 957, which, like the accumulator clearance lever 900, is fulcrumed on the shaft 958.

Lever 957 has on its upper end an arcuately formed upper arm 959 which is similar to arm 901 and acts against an opposite pin similar to the pin 906 (Fig. 2) but projecting from the opposite end of shaft 625. This opposite pin controls another key in shaft 625 corresponding to key 920 for selectively coupling the shaft 625 to one or the other of two cam units corresponding in construction and function exactly to the cam units which include the cam 626 and the cam 910, respectively. Furthermore, a single spring is employed to maintain the two keys against their control pin, this spring being compressed between the two keys within the keyway in the shaft in which the keys are mounted.

The cam units for effecting clearance of the counter register function to rock a pair of shafts 955 and 956 (Fig. 9) corresponding to shafts 635 and 759, which control the accumulator clutches, the rocking movements of these shafts 955 and 956 controlling the dial clutches in the counter register exactly the same as the rocking movement of the shafts 635 and 759 controls the dial clutches of the accumulator register.

Leftward movement of the link 963 (Fig. 9), in response to depression of the counter dial clearance key 880, causes the shoulder 925 on the lever 964 to engage the ear 926 on the clutch actuating lever 523 to engage the main clutch exactly the same as when the key 881 is depressed. It should be noted in this regard, that both levers 896 and 964 have shoulders 925 which overlie the ear 926 so that rocking of either lever in response to the depression of the respective clear key rocks the clutch actuating lever to clutch engaging position.

The clearance mechanism for the counter dials, like that for the accumulator dials, is adapted to function with the dials moving in negative direction during the clearance operation. No special mechanism is necessary to insure the accumulator shaft 551 moving in negative direction during a clearance operation. However, it is necessary to provide a special mechanism for automatically insuring that the counter dial shaft 553 will rotate in negative direction during the clearance operation, irrespective of the position of the lever 480 (Fig. 1). It will be remembered that when lever 480 is positioned opposite the division symbol, the counter register shaft rotates in the opposite direction from the accumulator shaft, whereas when the lever is positioned opposite the multiplication symbol, the counter register shaft rotates in the same direction as the accumulator shaft.

The mechanism for insuring negative rotation of the counter register shaft includes the toggle linkage members 967 (Fig. 9) and 968 interconnected by the stud 969, as previously mentioned. This stud 969 is also connected to the lower end of the link 581, having its upper end connected by stud 490 to the lower end of the counter dial reverse lever 480. When the links 967 and 968 are pushed toward the right in response to depression of the key 880, the lower end of link 581 is rocked toward the right (about stud 490) and rocks lever 582 counter-clockwise the same as it would have been had the lever 480 been moved into position opposite the multiplication symbol, thereby causing the counter register driving mechanism to rotate the counter register shaft in the same direction (the minus direction) as the accumulator shaft.

The arm 971 (Figs. 9 and 2) is sufficiently long to preclude it from passing beyond the pin 559 (Fig. 2) if, at the time the counter register clear key is depressed, the lever 480 happens to be in multiplying position.

When only the counter register is cleared, the key 920 (Fig. 2) should be set in neutral position so that neither the cam 626 nor the cam 922 will be rotated, and this setting is performed by moving the arm 901 into intermediate position in which the intermediate level 904 bears against the pin 906. Similarly, when only the accumulator register is cleared, the key associated with the counter register clearance mechanism and corresponding to the key 920 is set in neutral position by positioning the arm 959 (Fig. 9) in intermediate position.

To effect this half movement of one or the other of arms 901 and 959, both the lever 900, carrying the arm 901 and the lever 957 carrying the arm 959 are loosely keyed on a common shaft 958 (Fig. 9) and by virtue of this loose keying, the rocking of either lever 900 or lever 957 through its full arc into clearance position, rotates the shaft 958 through a small angle sufficient to move the other lever 957 or 900, as the case may be, into neutral position.

In order to prevent partial movement of the lever 582 in response to the half movement of the lever 957 imparted to it through shaft 958 when lever 900 is rocked for an accumulator register clearance, lever 957 is coupled to link 968 by a stud 972 which rides in a slot 973 in link 968. This slot is sufficiently long to permit movement of the lever 957 into intermediate (neutral) position without producing movement of the link 968.

SUMMARY OF OPERATION

The manipulation of the first embodiment (Fig. 1) is substantially the same as that of conventional plus and minus bar calculating machines, and its complete operation will be obvious to those familiar with machines of this general type from the foregoing detailed description of operation of those elements of the machine that are new. However, the manipulation of the machine in multiplication and division will be briefly outlined.

*Multiplication*

In multiplication, the lever 480 (Fig. 1) is set adjacent the multiplication symbol, so that the counter and accumulator registers both rotate in the same direction. Thereafter the multiplicand is set in the keyboard on the keys 100 and the plus bar 505 is depressed, whereupon the machine cycles to repeatedly add the keyboard factor into the accumulator register 500 and repeatedly add "1" into that dial of the counter register 503 that is directly under the indicator 501. The plus bar is held down until the indicated dial of the counter register registers the first digit of the multiplier, when the plus bar 505 is released. The accumulator register then shows the product, if the multiplier contains only one digit. If the multiplier contains more than one digit, the shift key 830 is next depressed to shift the indicators 501 and 502 one order to the right, which automatically associates the keyboard with the indicated orders. The plus bar 505 is then held down to repeatedly add the multiplicand into the new group of orders of the accumulator register 500 and repeatedly add "1" into the second order of the counter register 503, and when the second dial of the counter register indicates the second digit of the multiplier, the plus bar 505 is released. The operations as described are repeated until the multiplicand has been multiplied by all the digits of the multiplier, at which time the product is visible in the accumulator register 500 and the multiplier is displayed in the counter register 503.

Assuming that at the beginning of the operation the indicators 501 and 502 were in leftmost positions, as shown in Fig. 1, and that the multiplicand was a three digit number and was set up in the first three orders of the keyboard, then the multiplicand was first added in the second, third and fourth dials of the accumulator register 500, the first dial being an overflow dial to take care of a tens transfer. Following the first actuation of the shift key 830, the mutliplicand was repeatedly added into the third, fourth and fifth dials of the accumulator register, and following the second actuation of the shift key 830, the multiplicand was repeatedly added into the fourth, fifth and sixth dials of the accumulator register.

The machine is then cleared by depressing the keys 101, 880 and 881, and the indicators 501 and 502 are restored to leftmost position by depressing the key 875.

Division

To perform division, the lever 480 is first set opposite the division symbol so that the counter dials will rotate oppositely to the accumulator dial. The dividend is then set into the keyboard and transferred into the accumulator register 500 by depressing the plus bar 505 only long enough to add the keyboard factor once. The keyboard clear key 101 and the lower dial clear key 880 are then depressed to release the keyboard and clear the "1" out of the counter register 503. The divisor is then set in the keyboard in the same decimal relation as the dividend, and the minus key 506 is depressed to repeatedly subtract the divisor from the dividend. The minus bar may be held depressed until an overdraft occurs, thereby indicating that the divisor has been subtracted too many times (an overdraft being indicated by the appearance of nines to the left of the highest order of the dividend factor). The overdraft is then corrected by depressing the plus bar 505 to add the divisor back into the accumulator register 500 until the overdraft is eliminated (as indicated by elimination of the nines to the left of the highest order of the dividend factor). Since the counter dials rotated in the plus direction during division, at the completion of the calculation, the counter register displays the quotient, and the accumulator register displays the remainder, if any.

The machine may then be cleared in exactly the same manner described in connection with multiplication.

Other types of calculation, such as complementary multiplication, negative multiplication, and complementary division, may be performed with this first embodiment of the invention, but since the manipulation of the machine is the same as the manipulation of other machines of the same general type, the detailed operation need not be set forth.

Alternative switching structures of Figs. 33 and 34

The schematic and physical arrangements shown in Figs. 33 and 34 represent alternatives comprising possible simplifications in Figs. 13 and 7 which reduce the number of switches and otherwise simplify the wiring for such a two-directional register. The schematic diagram of Fig. 33 may be alternatively substituted in place of the bottom part of Fig. 13 to comprise a component part of the complete machine disclosed in connection therewith.

In the present arrangement, switch 1120 (Fig. 33) replaces the two switches 705 and 710 (Fig. 13) and is jointly controlled by two elements 1125 and 1126, which elements may be controlled in the same way and by the same means that the switch leaves 705 and 710, respectively, are controlled. Thus element 1125 is up when the dial registers "9" and element 1126 is up when the direction of operation is plus; element 1126 is also up when the dial registers "0" and the element 1125 is up when the direction of operation is minus. The arrangement is therefore such that the switch 1120 is normally open and is closed only when the elements 1125 and 1126 are simultaneously both up, thereby raising interponent 1127 sufficiently to close switch 1120. If only one of the elements 1125 and 1126 is up at a time, the interponent 1127 is not moved sufficiently to close switch 1120.

Switch 1112 corresponds to the switch 712 (Fig. 13) and is normally closed at the beginning of each operating cycle, but is opened if and when the dial passes from "9" to "0" or "0" to "9." In all but the lowest decimal order an interponent 1128 is provided to open this switch when switch 1120 is closed.

If a series of dials, such as those in the XIII, XIV, XV orders stand at "9" during plus operation or at "0" during minus operation, the corresponding three switches 1120 will be closed, and the three associated switches 1112 will be opened, so that the XIII, XIV and XV magnets 660 will be disconnected from line 700 and connected together by lead 701. If the XVI dial then passes from "9" to "0" or "0" to "9," as the case may be, during the following actuating cycle, the XVI switch 1112 will be opened and the lead 701 and all three magnets XIII, XIV, and XV will be cut off from the source of supply (line 699), so as to effect a simultaneous transfer in the XIII, XIV, XV dials as explained in connection with the wiring diagram of Fig. 13.

It will be observed that the physical arrangement shown in Fig. 34 corresponds to the schematic arrangement shown in Fig. 33 except for the fact that a slight further simplification is effected by utilizing in each order a single yoke 1143 pivotally mounted on lever 1130 and operated directly by the two levers 1140 and 1145 instead of having the two last mentioned levers control the switches 1120 through interponents 1127 and the elements 1125 and 1126 as described in connection with Fig. 33.

Cam 750 (Fig. 34) actuates the bell crank 1145 in exactly the same way the cam 750 (Fig. 7) actuates bell crank 745. The second lever 1140, corresponding to lever 740 in Fig. 7, is rocked by the shaft 615 (Figs. 34 and 7). In short, the horizontal arm of bell crank 1145 is up when the dial stands at "0," and down at "9" and in its intermediate position at "1" to "8"; and arm 1140 is up during plus and down during minus operation of the machine.

Two studs 1141 and 1142 are mounted on the arms 1140 and 1145, respectively, and rest between diagonally opposed ears formed on yoke 1143 freely pivoted on the lever 1130 by means of stud 1131. Lever 1130 is freely pivoted on shaft 759 and is urged in a clockwise direction by a spring 1132 to the position shown, wherein it is blocked by a stationary stud 1133. Thus if the arms 1140 and 1145 are in the same position, i. e., both up or both down, or if arm 1145 is in its intermediate position, the studs press against the same diagonal surface and merely rock member 1143 on stud 1131 without moving arm 1130. If, however, one arm is up and the other is down, as for example when the dial stands at "9" during plus operation or at "0" during negative operation, the studs 1141 and 1142 are spaced apart to such an extent that they engage opposite diagonal surfaces and force the yoke 1143 toward the left and arm 1130 counterclockwise, which movement of arm 1130 allows switch 1120 to close and at the same time opens switch 1112.

The elements 588, 765, 766, and 759 (Fig. 34) operate exactly as described hereinbefore to control the switch 1112 corresponding to switch 712 (Fig. 4), namely, the switch is closed at the beginning of each cycle and opened if and when the controlling dial passes from "9" to "0" or "0" to "9." It will be noted that the insulation tip on lever 766 is so narrow that it operates to open and close switch 1112 just as in the earlier described arrangement, without at any time affecting switch 1120. The insulation on lever 1130 is, however, so wide that in closing switch 1120 it opens switch 1112 and vice versa. It will be noted that switch 1112 is opened if either lever 766 or lever 1130 is set for opening it, and is only closed if both said levers are simultaneously set to the positions permitting it to be closed, in which case switch 1120 will always be open.

SECOND EMBODIMENT

The second embodiment of the machine is a modification of the first embodiment, to which reference is made for details not specifically described hereinafter.

Probably the most important distinctive feature of the second embodiment, as compared to the first embodiment, is that the dials are driven in one direction only, and subtraction is effected by reversing the actuator timing switch, to thereby effect entry of the tens complement of the subtrahend. This feature is desirable, in that it reduces the number of switches in the transfer circuit, simplifies the drive to the dial shafts, and makes possible the use of a relatively simple and inexpensive electric switch to effect negative operation of the counter register, instead of the more costly reversible gear mechanism.

UNIDIRECTIONAL DRIVE TO DIALS

The plus and minus keys 505 and 506 (Fig. 24) initiate operation of the machine by rocking the ear 525 out of the main clutch 10 and shifting the reversing link 576 toward the left in exactly the same manner as in the first embodiment, but the reversing link 576 does not affect the direction of rotation of the dials.

Thus the accumulator dial shaft 551 (Figs. 23 and 24) has a gear 985 secured thereto which meshes with a gear 984 which in turn meshes with a gear 983 secured to the driven disc 12 of the clutch 10, so that the accumulator shaft 551 is always driven clockwise in response to rotation of the main clutch.

A second gear 986 is mounted on the accumulator shaft 551 for rotation therewith, and this gear 986 meshes with a gear 987 which in turn meshes with a gear 988 on the counter register shaft 553 so that the latter is also always rotated in clockwise direction.

REVERSIBLE DRIVE TO THE ACTUATOR TIMING SWITCH

The actuator timing switch 990 (Fig. 23) is adapted to be rotated in either direction, the direction being controlled by the reverse link 576 (Fig. 24).

Thus the rotatable element of the timing switch includes an arm 993 (Fig. 23) keyed to a shaft 995, which shaft is hollow and contains an axial pin having secured thereto a lateral pin 996 which projects through a longitudinal slot in the shaft 995 and is engageable either in a notch in the hub of a gear 983 or a notch in the hub of a gear 984. Both of the gears 983 and 984 are rotatable on the shaft 995 and are driven in opposite directions, the gear 984 meshing directly with the clutch gear 983, as previously described, and the gear 983 being driven from the clutch gear 983 through a pair of integral idler gears 991 and 992.

The position of the pin 996 is controlled by an arm 982 which is rocked by the reverse link 576 (Fig. 24).

When the plus key 505 is depressed, the arm 982 is rocked counterclockwise, and the pin 996 is moved out by a spring 997 to connect the gear 984 to the shaft 995 and cause the timing switch element 993 to rotate in counter-clockwise direction. Except when the plus key 505 is depressed, the pin 996 is engaged with gear 983, as shown in Fig. 23, and the timing switch arm 993 is rotated clockwise.

TIMING SWITCH

The timing switch 990 (Fig. 23) includes, in addition to the movable arm 993, a stationary plate 999 supporting an arcuate row of contacts 1000 and a minus transfer contact 1001 and a plus transfer contact 1002 arranged at opposite ends of the row of contacts 1000. All these contacts are shown developed in line 2 of the schematic timing diagram of Fig. 22.

The contacts 1000, 1001 and 1002 are adapted to be swept by a brush 1003 (Figs. 23 and 25) mounted on the arm 993, the brush successively connecting the contacts to a ring 1006 also mounted on the stationary plate 999.

The ring 1006 is permanently connected to the plus terminal of the supply line; the contacts 1000 are connected to the "0" to "9" selection contacts 512 in all the orders of the keyboard by bus leads 640 to 649, respectively; and the two transfer contacts 1001 and 1002 are connected to the transfer circuits by a common lead 1005.

When the brush 1003 rotates counter-clockwise (the plus direction) it first connects the minus transfer contact 1001 to the supply line, but, as explained in the description of the first embodiment, the switches 685 are in the left position (as shown in Fig. 25) during digitation so that the minus transfer contact 1001 is ineffective during plus operation. After leaving the minus transfer segment 1001, the brush sweeps over the ten contacts 1000 and may supply current to any of these contacts to effect selective digitation in accordance with the setting of the keyboard brushes 510. By the time the brush 1003 reaches the plus transfer contact 1002, the digitation phase of the cycle has been completed, and the switches 685 have been thrown to the right (as explained in the description of the first embodiment), so that current can be supplied to the magnet 660, over the transfer contact 1002, in those orders in which no transfer is to be effected.

Subtraction

Subtraction is accomplished in the second embodiment by adding the complement of the subtrahend to the minuend. This complement is composed of the nines complement of each digit of the subtrahend except the rightmost digit thereof, which is the tens complement of that digit. In problems of subtraction the minuend is first set up on the keyboard and is entered into the accumulator upon depression of the add bar. The subtrahend is then set in the keyboard and depression of the minus bar causes engagement of the dial clutches in those orders into which significant digits are to be entered. The dials are driven in an additive direction during subtraction as well as during addition, but the timing switch is reversed, as described hereinbefore, so that the nines complement of each digit of the subtrahend is entered into the accumulator during the digitation phase of the cycle initiated by the minus bar. Then during the transfer phase of the same cycle a "fugitive digit" or "1" is added into the rightmost order, thereby making the resulting entry in that order the tens complement of the rightmost digit of the subtrahend. The mechanism for effecting the entry of this "fugitive digit" will be described hereinafter.

In subtraction the switch arm 998 (Fig. 25) is driven clockwise (from right to left in line 2 of the explanatory diagram of Fig. 22) and first sweeps the plus transfer contact 1002 and then sweeps the "plus 9 minus 0" contact 1000. As in the first embodiment, the accumulator clutches are mechanically engaged by a clutch dog cam 1091 (Fig. 26) corresponding to the clutch dog cam 626 of the first embodiment. However, in the second embodiment the rise 1058 (line 5 of Fig. 22) on cam 1091 is so positioned that irrespective of the direction of rotation of the timing switch brush 1003 it is contacting either the "plus 9 minus 0" contact (line 2, Fig. 22) or the "plus 0 minus 9" contact when the rise 1058 (line 5 of Fig. 22) of the clutch dog cam 1091 rocks the clutch dog.

It follows that if, for example, the "2" selection circuit in the VIII order of the keyboard (Fig. 25), is closed, as indicated at 510a, the magnet 660 connected thereto (the XVI magnet in Fig. 25) is energized when the brush 1003 (traveling clockwise) reaches the "plus 2 minus 7" contact (line 2 of Fig. 22), and the corresponding accumulator clutch is disengaged after its dial has rotated an amount proportional to the nines complement of two, or through seven digits.

It also follows that if no value is set up in an order of the keyboard the brush 510 in that order closes the zero circuit to the corresponding magnet 660, so that the magnet receives its energizing impulse from the "plus 0 minus 9" contact, and disengages the associated accumulator clutch after the dial has rotated through nine digits.

In the first embodiment, "9" contacts (line 2 of Fig. 12) were not necessary, because a nine digitation was effected by the drop 628 in the clutch dog cam 626 (line 5 of Fig. 12) which released all of the accumulator clutch dogs that had not been previously tripped by their respective magnets. Similarly, in this second embodiment the clutch dog cam 1091 (line 5, Fig. 22) drops off to release all the accumulator clutch dogs, at approximately the same time the magnets are energized over the "plus 9 minus 0" contact or the "plus 0 minus 9" contact. Therefore the "plus 0 minus 9" contact is only necessary to effect a zero digitation during positive operation, and the "plus 9 minus 0" contact is only necessary to effect a zero digitation during negative operation.

REVERSAL OF COUNTER REGISTRATION

As previously explained, negative actuation of the accumulator dials is effected by reversing the rotation of the timing switch 990. This also effects negative actuation of the counter dial. However, it is sometimes desired, as when performing division, to make a positive registration on the counter dials during negative registration of the accumulator dials. Therefore reversal of the counter registration relative to the accumulator registration is provided for by a circuit including a double throw switch 1055 (Fig. 25) actuated by a lever 1070 (Fig. 32) which corresponds to the counter reverse lever 480 (Fig. 1) of the first embodiment and is movable between an upper position identified with the multiplication symbol and a lower position identified by the division symbol. When the lever 1070 is in upper, or multiplying, position, the switch 1055 (Fig. 25) connects the active counter magnet (over contact 1037 of the shift switch) to the "plus 1 minus 8" contact of the timing switch, and when the lever 1070 is in "dividing" position the switch 1055 connects the active counter magnet to the "plus 8 minus 1" contact.

Since in a division operation the timing switch 990 is operated in minus or clockwise direction, the brush 1003, early in the cycle, wipes over the "plus 8 minus 1" contact to supply current through the bus lead 648, the lead 1056, and the switch 1055 (in position 1055a of Fig. 25) to energize the active counter magnet and disengage the associated clutch after the dial has advanced one digit.

During multiplication, however, the switch 1055 is thrown to multiplying position, so as to effect a digitation of "1" in the active counter dial during the positive operating cycle of the accumulator register.

The operation of the counter dials and the accumulator dials as described, in both division and multiplication, results from the symmetrical central positioning of the contact 1000 (line 2 of Fig. 22) in the path of travel of the brush 1003 so that the cam rise at 1058 (line 5 of Fig. 22) is in the same timing position with respect to the "plus 8 minus 1" contact during minus movement of the brush 1003 as it is to the "plus 1 minus 8" contact during plus movement of the brush 1003.

*Fugitive digits*

It is necessary to enter a fugitive digit in the rightmost dial as previously explained, and it is accomplished electrically, in this embodiment, by opening the transfer circuit to the rightmost accumulator magnet 660 (Fig. 25) and to the rightmost counter magnet (not shown).

To this end, the link 576 (Fig. 25) has an insulation shoulder 1008 which normally maintains a fugitive digit switch 981 in open condition, but permits the switch to close when the plus key 505 is depressed for positive operation. Referring to Fig. 25, this switch 981 is inserted in the lead 1015 of the transfer circuit to the XVI magnet 660, so that when the switch is open (during negative operation) the impulse applied to the lead 1005 over the transfer contact 1001, is ineffective to energize the XVI magnet 660, but the impulse can reach the magnets in the other orders over the transfer lead 1014.

When the plus key 505 (Fig. 24) is depressed, the switch 981 is closed, so that during positive operation current is always supplied to the lowest ordinal magnet (XVI) during the transfer phase, and prevents entry of the fugitive digit. During negative operation, however, in response to depression of the minus key, the switch 981 is not closed, and since under this condition the magnet 660 and the XVI order is not energized, the fugitive digit is entered into that order during the transfer phase.

Similarly, current must be supplied to the lowest order counter register magnet when the counter is operating in the positive direction, and must be cut off when the counter is operating in the negative direction. The control of the current supply to the lowest order counter register magnet is complicated by the fact that the counter reverse lever 1070 (Fig. 32) serves to reverse the sign of counter operation with respect to the sign of operation of the accumulator register, necessitating joint control of the counter by the main reverse link 576 (Fig. 24) and by the counter reverse lever 1070 for the introduction of the fugitive digit into the counter.

It will be apparent that if the main reverse link 576 is set for plus operation and the counter reverse lever 1070 (Fig. 32) is set for multiplication, or the main reverse link 576 is set for minus operation and the counter reverse lever is set for division, then the direction of counter operation is positive, and current must be supplied to the lowest order counter magnet for preventing entry of the fugitive digit. On the other hand, if the main reverse link is in plus position and the counter reverse lever is set for division, or the main reverse link is in minus position and the counter reverse lever is set for multiplication, then the direction of counter operation is negative, and the fugitive digit must be entered by cutting the current off the lowest order counter magnet during the transfer phase.

To satisfy the foregoing requirements, there is employed a circuit containing two switches, one actuated by the main reverse link 576 and the other by the reverse lever 1070. Thus a double throw switch 1100 (Fig. 24) is actuated by an insulating shoulder 1009 on the main reverse link 576 to close contacts 1102 during negative operation and close contacts 1101 during positive operation. A second switch 1105 (Fig. 32) is electrically associated with the switch 1100, but is controlled by the reverse lever 1070. The switch 1105 is identical to and directly behind the switch 1028, as viewed in Fig. 32, and is controlled by the insulation tip 1108 on the lever 1070.

Referring now to Fig. 25, the switches 1100 and 1105 are located in a counter transfer circuit including a lead 1115 corresponding to the lead 1015 in the accumulator circuit, this lead 1115 extending to the lowest or rightmost counter magnet (not shown). When the switch in the counter register circuit corresponding to the switch 685 (Fig. 25) in the accumulator register circuit, is shifted to the right, the lead 1115 is connected to the lowest order counter magnet. A lead 1114 in the counter register circuit corresponds exactly to the lead 1014 in the accumulator transfer circuit, over which the transfer impulse is transmitted to the higher order magnets.

It will be obvious from an inspection of Figs. 24, 25 and 32 that when the lever 1070 is in multiplying position and the main reverse ink 576 is in minus position, or when the lever 1070 is in dividing position and the link 576 is in plus position, the circuit to the lead 1115 is open, and a fugitive digit will be entered. This is proper, because under both conditions the sign of the counter register operation is minus. In all other positions of the lever 1070 and the link 576, the sign of operation of the counter register is plus, and the switches 1105 and 1100 will complete the circuit from the lead 1114 to the lead 1115 to prevent entry of the fugitive digit.

ACCUMULATOR CLUTCH

The accumulator clutch construction in the second embodiment is shown in Fig. 27 and is substantially the same as that in the first embodiment shown in Fig. 4 except for certain simplifications of structure permitted by the unidirectional drive to the dials.

Thus a ratchet disc 1080 (Fig. 27) is substituted for the notched disc 586 of Fig. 4, and it carries a single stud 590 which serves to rock the single clutch pawl 1082 counter-clockwise about its supporting stud 587, when the ear 607 blocks the ratchet. The stud 588 carries no pawl and serves merely to retain a spring 1081 and to engage the nose 770 of the transfer lever 765 when the dial 1084 passes from "9 to "0."

The clutch includes a lever 1085 corresponding to the lever 940 of Fig. 4, except that the nose 1086 (Fig. 27) is differently shaped from the nose 945 (Fig. 4) since the numerals on the dial 1084 are in reverse order relative to the dial 500 of the first embodiment, because the latter rotated counter-clockwise for positive actuation, whereas the dial 1084 rotates clockwise. Because of the different shape of nose 1086 it is rocked by stud 588, during clearance, as the dial 1084 passes from "9" to "0" instead of during passage from "1" to "0," as in the case of the first embodiment.

The shaft 1083 (Fig. 28) corresponds to shaft 615 (Fig. 7) of the first embodiment, but differs from shaft 615 in having no keyway, since there is no lever corresponding to the lever 740 of Fig. 7. The lever 745 is unchanged, but the cam 1089 is different from the cam 750 of the first embodiment, in that cam 1089 has no zero lobe or "9" recess (751 and 752, respectively, in Fig. 7), but has a lobe 1090 positioned to rock the lever 745 counter-clockwise when the dial stands at "9."

The mechanism for rocking the shaft 635 (Fig. 27) to effect engagement of the accumulator clutches is substantially the same as in the first embodiment shown in Fig. 4, except for the different timing. Thus, as has been previously explained with reference to Fig. 22, the rise 1058 of the clutch dog cam 1091 is retarded with respect to the rise 627 (line 5 of Fig. 12) of the clutch dog cam 626, and the timing switch contacts (line 2, Fig. 22) are symmetrically positioned midway in the path of travel of the rotating brush 1003 (Fig. 25) so that irrespective of the direction of rotation of the brush 1003 it contacts the first of the segments 1000 at the time that the rise 1058 on the clutch dog cam 1091 comes into action.

TRANSFER CIRCUITS

Since the dials in the second embodiment always rotate in one direction, a simplified transfer circuit and switch structure for controlling it can be employed. Thus in each dial order there are only two switches 1010 and 1011 (Fig. 25) as against three switches 712, 705 and 710 (Fig. 13) in the first embodiment.

The switch 1010 (Fig. 27) is opened when its controlling dial (the dial immediately to its right in Fig. 25) passes from "9" to "0," by the stud 588 (Fig. 27) bearing against the nose 770 on lever 765 exactly as previously explained in connection with the first embodiment.

The switch 1011 (Fig. 28) is actuated to close contacts 1013 and open contacts 1012 when its controlling dial stands at "9" (by the lobe 1090 on cam 1089) but closes contacts 1012 and opens contacts 1013 in all other positions of the dial. The operation of the transfer circuit in Fig. 25 will be obvious from the previous detailed description of operation of the transfer circuit (Fig. 13) of the first embodiment, since the switch 1010 (Fig. 25) corresponds in function to the switch 712 (Fig. 13) and the switch 1011 (Fig. 25) corresponds in part to the switch 710 (Fig. 13). The conditions requiring the cooperative functions of switches 705 and 710 (Fig. 13) of the first embodiment do not exist in the second embodiment because of the unidirectional rotation of the dials in the latter.

SHIFT SWITCH

The shift switch of the second embodiment differs in detail from that of the first embodiment. Thus referring to the schematic diagram of Fig. 25 and the structural drawings of Figs. 29, 30 and 31, the stationary insulating disc 1021 has twenty-four contacts 1020 molded therein, sixteen of these contacts being connected to the accumulator magnets 660 (Fig. 25) and the remaining eight to the counter magnets. There are also molded in the stationary disc 1021, two arcuate contacts 1025 and 1026, contact 1026 being connected to the zero bus lead 640 by the lead 1027, while contact 1025 is connected to a double throw switch 1028 by a lead 1029.

The stationary disc 1021 (Fig. 30) is riveted to one of the machine frame plates 1030 by three rivets, 1031, the plate having a hole therein to form a bearing for a shaft 1032 which corresponds to shaft 829 in Fig. 20 and drives the movable element of the switch.

This movable element includes an insulation disc 1040 carrying eight single contacts or brushes 1035, fifteen double brushes 1036 and one single brush 1037, all of which are retained in suitable apertures in the disc 1040 by two thin insulation discs 1041 and 1042. The eight brushes 1035 and the single brush 1037 are urged toward the left (Fig. 30) by coil springs 1043 positioned back thereof, and the double brushes 1036 are pressed to the left by leaf springs 1044 positioned back thereof so that each brush is pressed into engagement with one of the arcuate contacts 1025 or 1026, and one of the individual contacts 1020. The insulation discs 1040, 1041 and 1042 are riveted to a flanged hub 1045 by rivets 1047, and the hub is secured by a pin 1046 to the shaft 1032, which is rotated in response to depression of the shift key (exactly the same as the shaft 829 in the first embodiment) to successively connect the keyboard to selected decimal orders of the accumulator controls, and bring a selected order of the register into operation.

As in the first embodiment, it is necessary to supply current to all offboard accumulator magnets so as to prevent rotation of their associated dials. With the shift switch in the position shown in Fig. 25, the right half of the accumulator register is connected to the keyboard. Thus the XVI magnet 660 is connected through lead 1051, one of the contacts 1020, one of the brushes 1035 and the lead 1050 to the contact strip 511 in the VIII order of the keyboard. On the other hand, the orders I to VIII in the left half of the accumulator register are connected to the zero bus lead 640, the circuit for one of these orders including the lead 1052, one of the contacts 1020, one of the brushes 1036, the arcuate contact 1026, and the lead 1027.

*Supplying zero impulse to offboard counter magnets*

It is also necessary to supply zero impulses to all offboard counter magnets, but this is complicated by provision for the independent reversal of the counter registers. Hence the lead 1029 (Fig. 25) which supplies the zero impulse to the arcuate contact 1025 of the shift switch, and thence to the inactive orders of the counter registers, is adapted to be connected either to the "plus 0 minus 9" or the "minus 0 plus 9" contact of the timing switch, over a switch 1028, which, like the switch 1055, is actuated by the lever 1070 (Fig. 32). Therefore, when the machine is set for multiplication (Fig. 25) the zero impulse is applied to the offboard counter magnets from the "plus 0 minus 9" contact 1000 over the lead 1060 and the switch 1028 to the lead 1029; and when the machine is set for division, the zero impulse is supplied from the "plus 9 minus 0" contact of the timing switch over the lead 1061 and the switch 1028 (set to the position 1028a) to the lead 1029.

Referring to Fig. 32, the lever 1070 is pivoted on a stud 1071 and has two levers 1078 and 1079 integral therewith and having insulated tips 1073 and 1108, respectively, which actuate the switches. Thus the insulated tip 1073 actuates the switches 1028 and 1055 and the insulated tip 1108 actuates the switch 1105. The lever 1070 is yieldably retained in either position of operation by engagement of a pin 1074 extending therethrough, with a spring 1075 secured to the underside of the machine cover 1072 and having recesses 1076 and 1077 to receive the pin 1074 in the two extreme positions of operation.

*Summary of operation of counter register reverse switches*

When the switches 1028 and 1055 (Fig. 25) are set to multiplying position, switch 1055 connects the magnet in the operative counter order to the "plus 1 minus 8" contact of the timing switch 990, and the switch 1028 connects all the other orders of the counter to the "plus 0 minus 9" contact of the timing switch. Therefore, if the machine is operated positively, a "1" digitation will be effected in the active order of the counter register and nothing in the other orders, whereas if the machine is operated negatively, an "8" digitation will be effected in the active order of the counter register, and a "9" digitation in all other orders, which, plus the fugitive digit, effects the subtraction of "1" from the active order by addition of complements.

When the switches 1028 and 1055 are in their "dividing" positions, the active counter order is connected to the "plus 8 minus 1" contact of the timing switch, and the inactive orders are connected to the "plus 9 minus 0" contact, which effects the digitation of "1" in the active counter register order, in the case of negative operation of the master timing switch 990, and subtracts the complement of "1" in the case of positive operation of the master timing switch, in a manner corresponding exactly to the complemental operation just described.

CLEARANCE MECHANISM

In the second embodiment, clearance is effected by depressing one or both of two keys 880 and 881 (Fig. 26) corresponding to the keys of the same number in the first embodiment (Fig. 9) and effecting clearance of the counter and accumulator dials, respectively, by moving two corresponding links 895 and 963 (Fig. 26) in the clearance control train. Link 895 rocks lever 896 which, acting through the link 897, rocks the lever 900 in exactly the same manner as explained with reference to Fig. 9, to select the particular group of controlling cams to effect clearance of the accumulator dials.

Since the dials in this second embodiment rotate in one direction only, the toggle linkage 967, etc. (shown in Fig. 9), is not necessary in the second embodiment. In the latter, the counter register clearance controls simply comprise a linkage from the link 863 (Fig. 26) to the link 957 which is a duplicate of that between link 895 and lever 900. Lever 957 corresponds to the lever of the same number in Fig. 9 and functions to select the counter group of cams.

The two groups of clearance cams correspond to and are identical with the cams of the first embodiment, as shown in Fig. 10, except for such changes in the shape of the cams as are necessary to effect the difference in timing described in connection with the cam 1091 (Fig. 26), and the operation of the present clearance mechanism can be readily understood from the description of the mechanism controlled by the cams in Fig. 10.

MANIPULATION

The manipulation of the second embodiment is exactly the same as that of the first embodiment, since the arrangement of the keyboard register, and control keys and lever is substantially identical in the two embodiments.

Having fully described the preferred embodiments of this invention, it is to be understood that I do not wish to be limited to the exact constructions herein set forth, which may obviously be varied in detail without departing from the spirit of this invention, but only as set forth in the appended claims.

I claim:

1. In a register having ordinal accumulator units, mechanism for driving said register through cycles having a digitation phase and transfer phase in each cycle, selection mechanism for entering digital values into the machine, ordinal clutches to selectively couple said accumulator units to said driving mechanism according to the value of the digits selected, ordinal clutch control means for engaging and disengaging said clutches, cyclically operable power means for moving said control means to clutch engaging position at a fixed time in each cycle, ordinal means for selectively disabling said moving means in each order in which a zero is selected, in combination with tens transfer means comprising, means for causing said cyclically operable means to normally move said control means to clutch engaging position at a second fixed time in each cycle to enter a transfer in each accumulator unit, and ordinal transfer control means responsive to the movement of the next lower order accumulator unit to selectively actuate said disabling means in each order in which a transfer is not indicated.

2. In a register having ordinal accumulator units, mechanism for driving said register through cycles having a transfer phase in each cycle, ordinal clutches to selectively couple said accumulator units to said driving mechanism, ordinal clutch control elements for causing engagement of said clutches, a cyclically operable member common to all said ordinal clutch control elements for rocking said control elements to clutch engaging position, ordinal means for selectively disabling said rocking member in different orders to thereby control the entry of selected values into different accumulator units, in combination with tens transfer means comprising, means for causing said cyclically operable member to normally engage all said clutches at a fixed time in each cycle to enter a transfer into each accumulator unit, and ordinal transfer control means responsive to the movement of the next lower order accumulator unit for selectively actuating said disabling means in each order in which a transfer is not indicated.

3. A cyclically operable register having ordinal accumulator units, driving mechanism therefor, ordinal clutches for selectively coupling said accumulator units to said driving mechanism for selected periods to effect selective movement thereof, ordinal clutch-actuating mechanisms for engaging and disengaging said clutches, each including spring means energized by engagement of its clutch for supplying power to disengage the clutch, cyclically operable power means for normally operating said ordinal clutch-actuating mechanisms to engage all said clutches at a fixed time early in each cycle and again at a fixed time late in each cycle, electrically actuated ordinal means for disabling said ordinal clutch-actuating mechanisms, a source of electric current for energizing said disabling means, digitation means for completing circuits to said disabling means at selected times to determine the extent of movement of said accumulator units in response to said first operation of said clutch-actuating mechanisms, and transfer control switching means responsive to movement of said accumulator units for selectively completing circuits from said source to the disabling means in all orders in which transfer is not indicated.

4. A register as described in claim 3, in which said transfer control means includes cyclically actuated common switch means, and switch means individual to each electrically actuated ordinal means, for applying current to all said latter means in parallel at said second fixed time, and means individual to each electrically actuated ordinal means for opening the said switch means individual thereto in response to movement of the next lower order accumulator unit into position indicating a transfer.

5. A register as described in claim 3, in which said transfer control means includes cyclically actuated common switch means, and switch means individual to each electrically actuated ordinal means, for applying current to all said latter means in parallel at said second fixed time, and means individual to each electrically actuated ordinal means for opening the said switch means individual thereto in response to movement of the next lower order accumulator unit into position indicating a transfer, said individual switch means being normally open, and said last-mentioned individual means including means for closing all said ordinal switch means in which transfer is not indicated.

6. A cyclically operable register having rotary ordinal accumulator units repeatedly rotatable in either direction through positions corresponding to digital values zero to nine, inclusive, and also rotatable through a transfer position intermediate adjacent nine and zero positions, an accumulator driving member and means for driving it in either direction through cycles including digitation and transfer phases, ordinal clutches for selectively coupling said accumulator units to said driving member, clutch-actuating mechanisms for engaging and disengaging said clutches, and including power-actuated devices normally operable to engage all clutches once during the digitation phase and once during the transfer phase, ordinal electro-responsive means for disabling each clutch-actuating mechanism, a source of current, digitation means including switches for selectively connecting said source to the disabling means in different orders during the digitation phase, and transfer means comprising a common transfer lead from said source and ordinal transfer leads associated with said electro-responsive devices, master switch means in each ordinal transfer lead, means for closing all said master switch means early in each cycle, and means for subsequently opening the master switch means in any order in response to movement of the next lower order unit in either direction through the transfer position.

7. A register as described in claim 6, including auxiliary ordinal switch means, each actuated by the accumulator unit in the next lower order for selectively completing a circuit from said master switch either to said common transfer lead or to the next lower ordinal lead, dependent upon the direction of movement of the accumulator units.

8. A register as described in claim 6, including auxiliary ordinal switch means, each actuated by the accumulator unit in the next lower order for selectively completing a circuit from said master switch either to said common transfer lead or to the next lower ordinal lead, dependent upon the direction of movement of the next lower order accumulator unit and its position at the end of the digitation phase, for effecting chain transfer.

9. A register as described in claim 6, including auxiliary switch means actuated by the next lower order accumulator unit operable to complete a circuit from said master switch to said common transfer lead when the next lower order accumulator unit is moved in either direction and stopped short of said transfer position during the digitation phase, and to complete a circuit from said master switch to the next lower ordinal lead in response to movement of the next lower order accumulator unit in either direction into a position adjacent said transfer position during the digitation phase.

10. A cyclically operable register comprising: ordinal accumulator units repeatedly rotatable in either direction through positions corresponding to digital values 0 to 9 inclusive, and also rotatable through a transfer position intermediate the adjacent "9" and "0" positions; an accumulator driving member cyclically movable in either direction; means for selectively coupling each ordinal accumulator unit to said driving member to effect transfer, ordinal electro-responsive devices effective when energized to disable said coupling means to prevent transfer; transfer control means including a source of current, a common transfer lead from said source, ordinal transfer leads associated with said electro-responsive devices, normally closed master switch means in each ordinal transfer lead, means for opening the master switch means in any order in response to movement of the next lower order accumulator unit through its transfer position; auxiliary ordinal switch means comprising, in each order, an intermediate terminal, a first switch movable between a first position connecting said intermediate terminal to said common transfer lead and a second position connecting said intermediate terminal to the next lower ordinal lead, a second switch movable between a first position connecting said ordinal lead to said common transfer lead, and a second position connecting said ordinal lead to said intermediate terminal; means for moving one of said switches into its second position in response to positive movement of the next lower accumulator unit, and means for moving the other of said switches into its second position in response to movement of the next lower accumulator unit into "9" position, whereby the associated electro-responsive device is connected to and controlled identically with the electro-responsive device in the next lower order for chain carry.

11. A cyclically operable register comprising: ordinal accumulator units repeatedly rotatable in either direction through positions corresponding to digital values 0 to 9 inclusive, and also rotatable through a transfer position intermediate the adjacent "9" and "0" positions; an accumulator driving member cyclically movable in either direction; means for selectively coupling each ordinal accumulator unit to said driving member to effect transfer, ordinal electro-responsive devices effective when energized to disable said coupling means to prevent transfer; transfer control means including a source of current, a common transfer lead from said source, ordinal transfer leads associated with said electro-responsive devices, normally closed master switch means in each ordinal transfer lead, means for opening the master switch means in any order in response to movement of the next lower order accumulator unit through its transfer position; auxiliary ordinal switch means comprising, in each order, an intermediate terminal, a first switch movable between a first position connecting said intermediate terminal to said common transfer lead and a second position connecting said intermediate terminal to the next lower ordinal lead, a second switch movable between a first position connecting said ordinal lead to said common transfer lead, and a second position connecting said ordinal lead to said intermediate terminal; means for moving one of said switches into its second position in response to movement of the next lower accumulator unit into "zero" position, and means for moving the other of said switches into its second position in response to movement of the next lower accumulator unit in negative direction, whereby the associated electro-responsive device is connected to and controlled identically with the electro-responsive device in the next lower order for chain carry.

12. A cyclically operable register comprising: ordinal accumulator units repeatedly rotatable in either direction through positions corresponding to digital values 0 to 9 inclusive, and also rotatable through a transfer position intermediate the adjacent "9" and "0" positions; an accumulator driving member cyclically movable in either direction; means for selectively coupling each ordinal accumulator unit to said driving member to effect transfer, ordinal electro-responsive devices effective when energized to disable said coupling means to prevent transfer; transfer control means including a source of current, a common transfer lead from said source, ordinal transfer leads associated with said electro-responsive devices, normally closed master switch means in each ordinal transfer lead, means for opening the master switch means in any order in response to movement of the next lower order accumulator unit through its transfer position; auxiliary ordinal switch means comprising, in each order, an intermediate terminal, a first switch movable between a first position connecting said intermediate terminal to said common transfer lead and a second position connecting said intermediate terminal to the next lower ordinal lead, a second switch movable between a first position connecting said ordinal lead to said common transfer lead, and a second position connecting said ordinal lead to said intermediate terminal; and means for moving said first switch into its first position in response to negative movement of the next lower accumulator unit into a position "1" to "9" inclusive, whereby the associated master switch is connected to said common transfer lead irrespective of the position of said second switch.

13. A cyclically operable register comprising: ordinal accumulator units repeatedly rotatable in either direction through positions corresponding to digital values 0 to 9 inclusive, and also rotatable through a transfer position intermediate the adjacent "9" and "0" positions; an accumulator driving member cyclically movable in either direction; means for selectively coupling each ordinal accumulator unit to said driving member to effect transfer, ordinal electro-responsive devices effective when energized to disable said coupling means to prevent transfer; transfer control means including a source of current, a common transfer lead from said source, ordinal transfer leads associated with said electro-responsive devices, normally closed master switch means in each ordinal transfer lead, means for opening the master switch means in any order in response to movement of the next lower order accumulator unit through its transfer position; auxiliary ordinal switch means comprising, in each order, an intermediate terminal, a first switch movable between a first position connecting said intermediate terminal to said common transfer lead and a second position connecting said intermediate terminal to the next lower ordinal lead, a second switch movable between a first position connecting said ordinal lead to said common transfer lead, and a second position connecting said ordinal lead to said intermedaite terminal; and means for moving said second switch into its first position in response to positive movement of the next lower order accumulator unit into a position "0" to "8" inclusive, whereby the associated master switch is connected to said common transfer lead irrespective of the position of said first switch.

14. A cyclically operable register comprising: ordinal accumulator units repeatedly rotatable in either direction through positions corresponding to digital values 0 to 9 inclusive, and also rotatable through a transfer position intermediate the adjacent "9" and "0" positions; an accumulator driving member cyclically movable in either direction; means for selectively coupling each ordinal accumulator unit to said driving member to effect transfer, ordinal electro-responsive devices effective when energized to disable said coupling means to prevent transfer; transfer control means including a source of current, a common transfer lead from said source, ordinal transfer leads associated with said electro-responsive devices, normally closed master switch means in each ordinal transfer lead, means for opening the master switch means in any order in response to movement of the next lower order accumulator unit through its transfer position; auxiliary ordinal switch means comprising, in each order, an intermediate terminal, a first switch movable between a first position connecting said intermediate terminal to said common transfer lead and a second position connecting said intermediate terminal to the next lower or- dinal lead, a second switch movable between a first position connecting said ordinal lead to said common transfer lead, and a second position connecting said ordinal lead to said intermediate terminal; means for moving said first switch into its first position in response to negative movement of the next lower accumulator unit into a position "1" to "9" inclusive, means for moving said first switch into its second position in response to positive movement of the next lower accumulator unit, means for moving said first switch into its second position in response to movement of the next lower accumulator unit into "0" position, means for moving said second switch into its first position in response to positive movement of the next lower accumulator unit into a position "0" to "8" inclusive, means for moving said second switch into its second position in response to negative movement of the next lower order accumulator unit, and means for moving said second switch into its second position in response to movement of the next lower order accumulator unit into "9" position.

15. A cyclically operable register comprising ordinal accumulator units repeatedly rotatable in either direction through positions corresponding to the digital values 0 to 9, inclusive, and also rotatable through an intermediate transfer position between the 9 and 0 positions; an accumulator driving means cyclically operable in either direction; means for selectively coupling each of said accumulator units to said driving means to effect transfer; ordinal electro-responsive devices effective when energized to disable said coupling means to prevent transfer; transfer control means including a source of current, a common transfer lead from said source, a first ordinal transfer circuit from each of said ordinal electro-responsive devices to said common transfer lead; a second ordinal transfer circuit from each ordinal electro-responsive device to the adjacent ordinal electro-responsive device, a first member movable in response to movement of said driving means in plus direction, and a second member movable in response to movement of the next lower order accumulator unit into its 9 position, said first and second circuits including means jointly responsive to the said movements of said first and second members for opening said first transfer circuit and closing said second transfer circuit.

16. A cyclically operable register comprising ordinal accumulator units repeatedly rotatable in either direction through positions corresponding to the digital values 0 to 9, inclusive, and also rotatable through an intermediate transfer position between the 9 and 0 positions; an accumulator driving means cyclically operable in either direction; means for selectively coupling each of said accumulator units to said driving means to effect transfer; ordinal electro-responsive devices effective when energized to disable said coupling means to prevent transfer; transfer control means including a source of current, a common transfer lead from said source, a first ordinal transfer circuit from each of said ordinal electro-responsive devices to said common transfer lead; a second ordinal transfer circuit from each ordinal electro-responsive device to the adjacent ordinal electro-responsive device, a first member movable in response to movement of said driving means in minus direction, and a second member movable in response to movement of the next lower order accumulator unit into its 0 position, said first and second circuits including means jointly responsive to the said movements of said first and second members for opening said first transfer circuit and closing said second transfer circuit.

17. A cyclically operable register comprising ordinal accumulator units repeatedly rotatable in either direction through positions corresponding to digital values "0" to "9" inclusive, and also rotatable through a transfer position intermediate the "9" and "0" positions; and accumulator driving means cyclically operable in either direction; means for selectively coupling each ordinal accumulator unit to said driving means to effect transfer; ordinal electro-responsive devices effective when energized to disable said coupling means to prevent transfer; transfer control means including a source of current; a common transfer lead from said source, a first ordinal transfer circuit from each of said ordinal electro-responsive devices to said common transfer lead, and a second ordinal transfer circuit from one ordinal electro-responsive device to the adjacent ordinal electro-responsive device, a normally closed master switch in each of said first transfer circuits, auxiliary switch means in said second transfer circuit, means for normally opening said auxiliary switch means, means under control of said next lower order accumulator unit for selectively closing said auxiliary switch means, and means for opening said master switch in any order in response to the movement of the next lower order accumulator unit through its transfer position.

18. In a register: rotatable ordinal accumulator units coaxial with each other and each rotatable through digital positions "0" to "9" inclusive and through a "transfer" position intermediate adjacent "9" and "0" positions; a common coaxial driving member, and means for cyclically rotating it first through a digitation phase and then through a transfer phase; ordinal clutches for individually coupling said accumulator units to said driving member; ordinal clutch engaging means individual to each clutch and adapted to be selectively disabled; means for first actuating said clutch engaging means in the digitation phase of each cycle for digitation and again in the transfer phase of each cycle for tens transfer; disabling means for selectively disabling said clutch engaging means, digitation means for rendering said disabling means operable during the digitation phase to control said accumulator units for the entry of desired values into different individual accumulator units; primary transfer means for rendering said disabling means operable to normally disable all said ordinal clutch engaging means during the transfer phase; and secondary transfer means in each order responsive to movement of the accumulator unit in the next lower order through the "transfer" position during the digitation phase, for disabling its associated primary transfer means.

19. A register as described in claim 18, including means for interlocking the said secondary transfer means in one order to the secondary transfer means in the next lower order in response to movement of the next lower order accumulator unit to "transfer" position, during the digitation phase.

20. A cyclically operable register comprising ordinal accumulator units repeatedly rotatable in either direction through positions corresponding to digital values 0 to 9, inclusive, and also rotatable through a transfer position intermediate the adjacent "9" and "0" positions. accumulator driving means cyclically operable in either direction; means for selectively coupling each order of said accumulator to said driving means to effect transfer, ordinal electro-responsive devices effective when energized to disable said coupling means to prevent transfer; transfer control means including a source of current, a common transfer lead from said source, ordinal transfer leads for connecting said electro-responsive devices to said common transfer lead, normally closed master switch means in each ordinal transfer lead, means for opening the master switch means in any order in response to movement of the next lower order accumulator unit through its transfer position; auxiliary ordinal switch means comprising, in each order, two switches, the first of which is movable between two positions, in one of which positions it acts in series with said master switch to connect said electro-responsive device to said common transfer lead, and in the other of which positions it acts in series with the second of said two switches to connect said electro-responsive device to the next lower order electro-responsive device, and the second of which two switches is movable between two positions, in one of which positions it acts in series with said master switch and said first switch to connect said electro-responsive device to said common transfer lead, and in the other of which positions it acts in series with said first switch to connect said electro-responsive device to the next lower order electro-responsive device.

21. A cyclically operable register comprising ordinal accumulator units repeatedly rotatable in either direction through positions corresponding to digital values 0 to 9 inclusive, and also rotatable through a transfer position intermediate the adjacent "9" and "0" positions; accumulator driving means cyclically operable in either direction; means for selectively coupling each order of said accumulator to said driving means to effect transfer, ordinal electro-responsive devices effective when energized to disable said coupling means to prevent transfer; transfer control means including a source of current, a common transfer lead from said source, ordinal transfer leads for connecting said electro-responsive devices to said common transfer lead, normally closed master switch means in each ordinal transfer lead, means for opening the master switch means in any order in response to movement of the next lower order accumulator unit through its transfer position; auxiliary ordinal switch means controlled by the digital position of the next lower order accumulator unit for selectively connecting each electro-responsive device either to the next lower order electro-responsive device or through said master switch to said common transfer lead.

22. A cyclically operable register comprising ordinal accumulator units repeatedly rotatable in either direction through positions corresponding to digital values 0 to 9 inclusive, and also rotatable through a transfer position intermediate the adjacent "9" and "0" positions; accumulator driving means cyclically operable in either direction; means for selectively coupling each order of said accumulator to said driving means to effect transfer, ordinal electro-responsive devices effective when energized to disable said coupling means to prevent transfer; transfer control means including a source of current, a common transfer lead from said source, ordinal transfer leads for connecting said electro-responsive devices to said common transfer lead, normally closed master switch means in each ordinal transfer lead, means for opening the master switch means in any order in response to movement of the next lower order accumulator unit through its transfer position; auxiliary ordinal switch means jointly controlled by the digital position of the next lower order accumulator unit and by the direction of operation of the machine for selectively connecting each electro-responsive device either to the next lower order electro-responsive device or through said master switch to said common transfer lead.

23. In a calculating machine: cyclically operable driving means; ordinal accumulator units; ordinal clutches for selectively coupling said accumulator units to said driving member; means for normally engaging said clutches at a fixed time in the cycle; ordinal magnets for controlling said clutches and means for selectively energizing said magnets to disable said clutch-engaging means, said means comprising: an electrical timing switch having a series of contacts representative of digital values, means for driving said timing switch in timed relation to said cyclically operable driving means, ordinal switching devices selectively settable to prepare different circuits corresponding to different digital values and including different ones of said timing switch contacts, whereby said timing switch completes a circuit for energizing each magnet when the corresponding accumulator unit has rotated an amount proportional to the digital value selected in the associated ordinal switching device, means for normally engaging said clutches at a second fixed time in the operating cycle, for transfer; means including normally closed ordinal transfer circuits for selectively energizing said magnets to disable said engaging means; said timing switch being reversible to condition said machine for subtraction; and means responsive to reversal of said timing switch for opening the ordinal transfer circuit in the lowest order, for entry of a fugitive digit therein.

24. In a register: ordinal accumulator units; unidirectional, cyclic driving mechanism having a digitation phase and a transfer phase; ordinal clutches for selectively coupling said accumulator units to said driving mechanism; ordinal electromagnets for controlling said clutches; means including a timing switch for effecting energization of said magnets, said switch having a plurality of digitation contacts for measuring the extent of differential advancement of said accumulator units during the digitation phase, two transfer contacts for controlling the accumulator advancement during the transfer phase, and a brush movable relative to said contacts in either direction for successively engaging first one transfer contact, then the plurality of digitation contacts, and then the other transfer contacts; reversible driving mechanism for said brush; and means operative in response to movement of said brush in either direction for rendering the first contacted of said transfer contacts, ineffective.

25. In a register having ordinal accumulator units, mechanism for driving said register through cycles having a transfer phase in each cycle, ordinal clutches to selectively couple said accumulator units to said driving mechanism, ordinal clutch control elements operable to cause engagement of their respective clutches, a cyclically operable member common to all ordinal clutch control elements, and a connecting device between said common member and each of said elements to enable said common member to rock said control elements to clutch-engaging position; in combination with tens transfer mechanism including: ordinal disabling means for disabling said connecting device, and ordinal transfer control means responsive to movement of the next lower order accumulator unit for selectively controlling actuation of said disabling means in each order in which a transfer is not indicated.

26. In a register having ordinal accumulator units, mechanism for driving said register through cycles having a transfer phase in each cycle, ordinal clutches to selectively couple said accumulator units to said driving mechanism, ordinal clutch control elements, each operable to cause engagement of its respective clutch, a cyclically operable member common to all said ordinal clutch control elements, a connecting device in conjunction with each of said elements, and means for selectively conditioning said device so as to selectively connect said elements to said common member; in combination with tens transfer mechanism including ordinal transfer control means responsive to movement of the next lower order accumulator unit for selectively controlling said conditioning means.

HAROLD T. AVERY.

REFERENCES CITED

The following references are of record in the file of this patent:

UNITED STATES PATENTS

| Number | Name | Date |
| --- | --- | --- |
| 1,447,871 | Lake | Mar. 6, 1923 |
| 2,056,403 | Lake | Oct. 6, 1936 |
| 1,902,035 | Lake | Mar. 21, 1933 |
| 1,882,764 | Bryce | Oct. 18, 1932 |